(12) United States Patent
Deshpande

(10) Patent No.: US 10,334,290 B2
(45) Date of Patent: Jun. 25, 2019

(54) CONTENT ADVISORY RATINGS INFORMATION

(71) Applicant: Sharp Kabushiki Kaisha, Sakai, Osaka (JP)

(72) Inventor: Sachin G. Deshpande, Camas, WA (US)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/532,525

(22) PCT Filed: Dec. 22, 2015

(86) PCT No.: PCT/JP2015/006397
§ 371 (c)(1),
(2) Date: Jun. 2, 2017

(87) PCT Pub. No.: WO2016/103683
PCT Pub. Date: Jun. 30, 2016

(65) Prior Publication Data
US 2017/0366826 A1  Dec. 21, 2017

Related U.S. Application Data

(60) Provisional application No. 62/095,441, filed on Dec. 22, 2014, provisional application No. 62/101,822, filed on Jan. 9, 2015, provisional application No. 62/107,949, filed on Jan. 26, 2015, provisional application No. 62/117,142, filed on Feb. 17, 2015,
(Continued)

(51) Int. Cl.
*H04N 21/235* (2011.01)
*H04H 60/16* (2008.01)
*H04H 60/72* (2008.01)
*H04N 21/434* (2011.01)
*H04N 21/84* (2011.01)
*H04N 21/845* (2011.01)
*H04N 21/262* (2011.01)

(52) U.S. Cl.
CPC .......... *H04N 21/235* (2013.01); *H04H 60/16* (2013.01); *H04H 60/72* (2013.01); *H04N 21/26283* (2013.01); *H04N 21/4345* (2013.01); *H04N 21/84* (2013.01); *H04N 21/8456* (2013.01)

(58) Field of Classification Search
CPC .. H04N 21/235; H04N 21/84; H04N 21/8456; H04N 21/26283
See application file for complete search history.

(56) References Cited

U.S. PATENT DOCUMENTS

2009/0083785 A1* 3/2009 Choi ............... H04H 20/30
725/28

OTHER PUBLICATIONS

Official Communication issued in International Patent Application No. PCT/JP2015/006397, dated Mar. 8, 2016.
(Continued)

*Primary Examiner* — Yassin Alata
(74) *Attorney, Agent, or Firm* — Keating & Bennett, LLP

(57) ABSTRACT

A method for decoding a service guide associated with a video bitstream comprising: receiving a fragment within said service guide; receiving content advisory ratings element; said content advisory ratings element includes at least one of a region identifier, a rating description, a rated dimensions, a rating dimensions value, a rating dimension and a rating value; and decoding said service guide.

14 Claims, 35 Drawing Sheets

Related U.S. Application Data provisional application No. 62/255,444, filed on Nov. 14, 2015.

(56) References Cited

OTHER PUBLICATIONS

"Universal Mobile Telecommunications System (UMTS); LTE; Multimedia Broadcast/Multicast Service (MBMS); Protocols and codecs", 3GPP TS 26.346 V12.4.0 Release 12, Jan. 2015, 210 pages.
Open Mobile Alliance, "Service Guide for Mobile Broadcast Services", Candidate Version 1.3, Jan. 14, 2014, pp. 25-32, 51-58.
Advanced Television Systems Committee, "ATSC Standard: Program and System Information Protocol for Terrestrial Broadcast and Cable", A65/2013, Aug. 7, 2013, pp. 1-142.
Open Mobile Alliance, "Service Guide for Mobile Broadcast Services", Approved Version 1.1, Oct. 29, 2013, pp. 1-299.
Open Mobile Alliance, "Service Guide for Mobile Broadcast Services", Approved Version 1.0.1, Jan. 9, 2013, pp. 1-232.
Advanced Television Systems Committee, "ATSC-Mobile DTV Standard, Part 4—Announcement", A/153:Part 4:2009, Oct. 15, 2009, 40 pages.

\* cited by examiner

| Name | Type | Category | Cardinality | Description | Data Type |
|---|---|---|---|---|---|

FIG. 4

| Name | Type | Category | Cardinality | Description | Data Type |
|---|---|---|---|---|---|
| ContentAdvisoryRatings | E1 | NM/TM | 0..N | Content advisory rating one for each rating region.<br>Contains the following elements:<br>RegionIdentifier<br>RatingDescription<br>RatedDimensions<br>RatingDimVal | |
| RegionIdentifier | E2 | NM/TM | 0..1 | Specifies the rating region for which the following rating description and rating dimension, rating value data is specified. If not present the value of RegionIdentifier is inferred to be 0. | unsignedByte |
| RatingDescription | E2 | NM/TM | 1 | Rating description text which represents the rating suitable for on-screen display. Contains the following attribute:<br>xml:lang | string |
| xml:lang | A | NM/TM | 0..1 | The language of the RatingDescription expressed with XML attribute 'xml:lang' | string |
| RatedDimensions | E2 | NM/TM | 0..1 | The number of region specific rating dimensions for which content advisory rating is specified. | unsignedByte |
| RatingDimVal | E2 | NM/TM | 1..N | Content advisory rating dimension and rating value for each rated dimension. Contains the following elements:<br>RatingDimension<br>RatingValue | |
| RatingDimension | E3 | NM/TM | 0..1 | Rating dimension index for which the rating value is specified. | unsignedByte |
| RatingValue | E3 | NM/TM | 1 | Rating value for the rating dimension specified in the associated RatingDimension element. | unsignedByte |

Content Advisory Ratings in Service Announcement

FIG. 5

| | | | Rating description text which represents the rating suitable for on-screen display. Contains the following attribute: xml:lang | |
|---|---|---|---|---|
| RatingDescription | E2 | NM/TM 1..N | | string |

| RegionIdentifier | E2 | NM/TM | 1 | Specifies the rating region for which the following rating description and rating dimension, rating value data is specified. | unsignedByte |

FIG. 7B

| RatingDimension | E3 | NM/TM | 1 | Rating dimension index for which the rating value is specified. | unsignedByte |

FIG. 7C

```
<?xml version="1.0" encoding="UTF-8"?>
<xs:schema xmlns:xs="http://www.w3.org/2001/XMLSchema">
   <xs:import namespace="http://www.w3.org/XML/1998/namespace"
      schemaLocation="http://www.w3.org/2001/xml.xsd"/>
   <xs:element name="ContentAdvisoryRatings" type="CARatingType"/>
   <xs:complexType name="CARatingType">
      <xs:sequence>
         <xs:element name="RegionIdentifier" type="xs:unsignedByte" minOccurs="0" maxOccurs="1"/>
         <xs:element name="RatingDescription" maxOccurs="1">
            <xs:complexType>
               <xs:simpleContent>
                  <xs:extension base="xs:string">
                     <xs:attribute ref="xml:lang" use="optional" default="en"/>
                  </xs:extension>
               </xs:simpleContent>
            </xs:complexType>
         </xs:element>
         <xs:element name="RatedDimensions" type="xs:unsignedByte" minOccurs="0"
maxOccurs="1"/>
         <xs:element name="RatingDimVal" type="RatingDimValType" minOccurs="1"
            maxOccurs="unbounded"/>
      </xs:sequence>
   </xs:complexType>

<xs:complexType name="RatingDimValType">
      <xs:sequence>
         <xs:element name="RatingDimension" type="xs:unsignedByte" minOccurs="0" maxOccurs="1"/>
         <xs:element name="RatingValue" type="xs:unsignedByte" minOccurs="1"/>
      </xs:sequence>
   </xs:complexType>
</xs:schema>
```

FIG. 8

```
<xs:element name="RatingDescription" maxOccurs="1">
    <xs:complexType>
        <xs:simpleContent>
            <xs:extension base="xs:string">
                <xs:attribute ref="xml:lang" use="optional" default="en"/>
            </xs:extension>
        </xs:simpleContent>
    </xs:complexType>
</xs:element>
```

FIG. 9A

```
<xs:element name="RatingDescription" minOccurs="1" maxOccurs="unbounded">
    <xs:complexType>
        <xs:simpleContent>
            <xs:extension base="xs:string">
                <xs:attribute ref="xml:lang" use="optional" default="en"/>
            </xs:extension>
        </xs:simpleContent>
    </xs:complexType>
</xs:element>
```

FIG. 9B

| Name | Type | Category | Cardinality | Description | Data Type |
|---|---|---|---|---|---|
| atsc:ContentAdvisoryRatings | E1 | NM/TM | 0..1 | Content advisory rating for each rating region. For each rating region rating value is provided for one or more rating dimensions. The content within the string is binary representation of the PSIP Content Advisory Descriptor. | string |

Content Advisory Ratings in Service Announcement

FIG. 10A

| Name | Type | Category | Cardinality | Description | Data Type |
|---|---|---|---|---|---|
| atsc:ContentAdvisoryRatings | E1 | NM/TM | 0..1 | Content advisory rating for each rating region. For each rating region rating value is provided for one or more rating dimensions. The content within the string is base64 encoded binary data. The binary data is PSIP Content Advisory Descriptor. | base64Binary |

Content Advisory Ratings in Service Announcement

FIG. 10B

| Syntax | No. of Bits | Format |
|---|---|---|
| content_advisory_ratings_descriptor() { | | |
|     reserved | 2 | '00' |
|     rating_region_count | 6 | |
|     for (i=0; i<rating_region_count; i++) { | | |
|         rating_region | 8 | uimsbf |
|         rated_dimensions | 8 | uimsbf |
|         for (j=0; j<rated_dimensions; j++) { | | |
|             rating_dimension_j | 8 | uimsbf |
|             reserved | 4 | '0000' |
|             rating_value | 4 | uimsbf |
|         } | | |
|         rating_description_length | 8 | uimsbf |
|         rating_description_text() | var | |
|     } | | |
| } | | |

Binary / Stream Syntax for Content Advisory Ratings Description

FIG. 11

| Name | Type | Category | Cardinality | Description | Data Type |
|---|---|---|---|---|---|
| Service | E | | | 'Service' fragment ... | |
| ... | | | | | |
| PrivateExt | E1 | NO/TM | 0..1 | An element serving as a container for proprietary or application-specific extensions. | |
| ContentAdvisoryRatings | E2 | NM/TM | 0..N | Content advisory rating one for each rating region.<br>Contains the following elements:<br>RegionIdentifier<br>RatingDescription<br>RatedDimensions<br>RatingDimVal | |
| RegionIdentifier | E3 | NM/TM | 0..1 | Specifies the rating region for which the following rating description and rating dimension, rating value data is specified. If not present the value of RegionIdentifier is inferred to be 0. | unsignedByte |
| RatingDescription | E3 | NM/TM | 1 | Rating description text which represents the rating suitable for on-screen display. Contains the following attribute:<br>xml:lang | string |
| xml:lang | A | NM/TM | 0..1 | The language of the RatingDescription expressed with XML attribute 'xml:lang' | string |
| RatedDimensions | E3 | NM/TM | 0..1 | The number of region specific rating dimensions for which content advisory rating is specified. | unsignedByte |
| RatingDimVal | E3 | NM/TM | 1..N | Content advisory rating dimension and rating value for each rated dimension. Contains the following elements:<br>RatingDimension<br>RatingValue | |
| RatingDimension | E4 | NM/TM | 0..1 | Rating dimension index for which the rating value is specified. | unsignedByte |
| RatingValue | E4 | NM/TM | 1 | Rating value for the rating dimension specified in the associated RatingDimension element.<br>Contains the following attribute:<br>xml:lang | unsignedByte |

Content Advisory Ratings in Service Announcement inside a Service fragment

FIG. 12

| Name | Type | Category | Card-inality | Description | Data Type |
|---|---|---|---|---|---|
| Service | E | | | 'Service' fragment ... | |
| ... | | | | | |
| PrivateExt | E1 | NO/TM | 0..1 | An element serving as a container for proprietary or application-specific extensions. | |
| atsc:ContentAdvisoryRatings | E2 | NM/TM | 0..1 | Content advisory rating for each rating region. For each rating region rating value is provided for one or more rating dimensions. The content within the string is binary representation of the PSIP Content Advisory Descriptor. | string |

Content Advisory Ratings in Service Announcement inside a Service fragment

FIG. 13

| Name | Type | Category | Card-inality | Description | Data Type |
|---|---|---|---|---|---|
| Service | E | | | 'Service' fragment ... | |
| ... | | | | | |
| PrivateExt | E1 | NO/TM | 0..1 | An element serving as a container for proprietary or application-specific extensions. | |
| atsc:ContentAdvisoryRatings | E2 | NM/TM | 0..1 | Content advisory rating for each rating region. For each rating region rating value is provided for one or more rating dimensions. The content within the string is base64 encoded binary data. The binary data is PSIP Content Advisory Descriptor. | base64Binary |

Content Advisory Ratings in Service Announcement inside a Service fragment

FIG. 14

| Name | Type | Category | Card-inality | Description | Data Type |
|---|---|---|---|---|---|
| Content | E | | | 'Content' fragment ... | |
| ... | | | | | |
| PrivateExt | E1 | NO/TM | 0..1 | An element serving as a container for proprietary or application-specific extensions. | |
| ContentAdvisoryRatings | E2 | NM/TM | 0..N | Content advisory rating one for each rating region.<br>Contains the following elements:<br>RegionIdentifier<br>RatingDescription<br>RatedDimensions<br>RatingDimVal | |
| RegionIdentifier | E3 | NM/TM | 0..1 | Specifies the rating region for which the following rating description and rating dimension, rating value data is specified. If not present the value of RegionIdentifier is inferred to be 0. | unsignedByte |
| RatingDescription | E3 | NM/TM | 1 | Rating description text which represents the rating suitable for on-screen display. Contains the following attribute:<br>xml:lang | string |
| xml:lang | A | NM/TM | 0..1 | The language of the RatingDescription expressed with XML attribute 'xml:lang' | string |
| RatedDimensions | E3 | NM/TM | 0..1 | The number of region specific rating dimensions for which content advisory rating is specified. | unsignedByte |
| RatingDimVal | E3 | NM/TM | 1..N | Content advisory rating dimension and rating value for each rated dimension. Contains the following elements:<br>RatingDimension<br>RatingValue | |
| RatingDimension | E4 | NM/TM | 0..1 | Rating dimension index for which the rating value is specified. | unsignedByte |
| RatingValue | E4 | NM/TM | 1 | Rating value for the rating dimension specified in the associated RatingDimension element.<br>Contains the following attribute:<br>xml:lang | unsignedByte |

Content Advisory Ratings in Service Announcement inside a Content fragment

FIG. 15

| Name | Type | Category | Cardinality | Description | Data Type |
|---|---|---|---|---|---|
| Content | E | | | 'Content' fragment <br> ... | |
| ... | | | | | |
| PrivateExt | E1 | NO/TM | 0..1 | An element serving as a container for proprietary or application-specific extensions. | |
| atsc:ContentAdvisoryRatings | E2 | NM/TM | 0..1 | Content advisory rating for each rating region. For each rating region rating value is provided for one or more rating dimensions. The content within the string is binary representation of the PSIP Content Advisory Descriptor. | string |

Content Advisory Ratings in Service Announcement inside a Content fragment

FIG. 16

| Name | Type | Category | Cardinality | Description | Data Type |
|---|---|---|---|---|---|
| Content | E | | | 'Content' fragment <br> ... | |
| ... | | | | | |
| PrivateExt | E1 | NO/TM | 0..1 | An element serving as a container for proprietary or application-specific extensions. | |
| atsc:ContentAdvisoryRatings | E2 | NM/TM | 0..1 | Content advisory rating for each rating region. For each rating region rating value is provided for one or more rating dimensions. The content within the string is base64 encoded binary data. The binary data is PSIP Content Advisory Descriptor. | base64Binary |

Content Advisory Ratings in Service Announcement inside a Content fragment

| Components | E2 | NM/TM | 0..1 | Component sub-element.<br>Contains the following elements:<br>    AudioComponent<br>    VideoComponent<br>    CCComponent<br>    AppComponent | |
|---|---|---|---|---|---|
| AudioComponent | E3 | NM/TM | 0..N | Role of the component.<br>Textual description intended for human consumption regarding role of the component.<br>Strings which could be used to describe role of component of ATSC3.0 service include:<br>    "Complete main"<br>    "Music"<br>    "Dialog"<br>    "Effects"<br>    "Visually Impaired"<br>    "Hearing impaired"<br>    "Commentary"<br><br>Any other useful description for a viewer can be provided.<br>Contains the following elements:<br>    ContentAdvisoryRatings<br>        Contains the following attribute:<br>        language | String |
| language | A | NM/TM | 0..1 | This element declares for the end users that this component is available in the language represented by the value of this element.<br>The textual value of this element can be made available for the end users in different languages. In such a case the language used to represent the value of this element is signaled using the built-in XML attribute 'xml:lang'. See section [7] Multi-language support. | String |
| VideoComponent | E3 | NM/TM | 0..N | Role of the component.<br>Textual description intended for human consumption regarding role of the component.<br>Strings which could be used to describe role of component of ATSC3.0 service include:<br>    "Primary video"<br>    "Alternative camera view"<br>    "Other alternative video component"<br>    "Sign language inset"<br>    "Follow subject video"<br>    "3D video left/right view"<br>    "3D video depth information"<br>    "Part of video array <x,y> of <n,m>" | String |

[Fig. 18(2)]

| | | | | | |
|---|---|---|---|---|---|
| | | | | "Follow-Subject metadata"<br><br>Any other useful description for a viewer can be provided.<br>Contains the following elements:<br>   ContentAdvisoryRatings<br>      Contains the following attribute:<br>   language | |
| language | A | NM/TM | 0..1 | This element declares for the end users that this component is available in the language represented by the value of this element.<br><br>The textual value of this element can be made available for the end users in different languages. In such a case the language used to represent the value of this element is signaled using the built-in XML attribute 'xml:lang'. See section [7] Multi-language support. | String |
| CCComponent | E3 | NM/TM | 0..N | Role of the component.<br>   Textual description intended for human consumption regarding role of the component.<br>   Strings which could be used to describe role of component of ATSC3.0 service include:<br>   "Normal"<br>   "Easy reader"<br><br>   Any other useful description for a viewer can be provided.<br>Contains the following elements:<br>   ContentAdvisoryRatings<br>      Contains the following attribute:<br>   language | |
| language | A | NM/TM | 0..1 | This element declares for the end users that this component is available in the language represented by the value of this element.<br><br>The textual value of this element can be made available for the end users in different languages. In such a case the language used to represent the value of this element is signaled using the built-in XML attribute 'xml:lang'. See section [7] Multi-language support. | String |
| AppComponent | E2 | NM/TM | 0..N | Role of the component.<br>   Textual description intended for human consumption regarding role of the component. | |

[Fig. 18(3)]

| | | | | | |
|---|---|---|---|---|---|
| | | | | Strings which could be used to describe role of component of ATSC3.0 service include:<br>"On Demand"<br>"Start-over"<br>"Companion-Screen"<br><br>Any other useful description for a viewer can be provided.<br>Contains the following elements:<br>    ContentAdvisoryRatings<br>        Contains the following attribute:<br>        language | |
| language | A | NM/TM | 0..1 | This element declares for the end users that this component is available in the language represented by the value of this element.<br><br>The textual value of this element can be made available for the end users in different languages. In such a case the language used to represent the value of this element is signaled using the built-in XML attribute 'xml:lang'. See section [7] Multi-language support. | String |

Content Advisory Ratings in Service Announcement inside each
component in Content fragment

| Name | Type | Category | Card-inality | Description | Data Type |
|---|---|---|---|---|---|
| ContentAdvisoryRatings | E4 | NM/TM | 0..N | Content advisory rating one for each rating region.<br>Contains the following elements:<br>RegionIdentifier<br>RatingDescription<br>RatedDimensions<br>RatingDimVal | |
| RegionIdentifier | E5 | NM/TM | 0..1 | Specifies the rating region for which the following rating description and rating dimension, rating value data is specified. If not present the value of RegionIdentifier is inferred to be 0. | unsignedByte |
| RatingDescription | E5 | NM/TM | 1 | Rating description text which represents the rating suitable for on-screen display. Contains the following attribute:<br>xml:lang | string |
| xml:lang | A | NM/TM | 0..1 | The language of the RatingDescription expressed with XML attribute 'xml:lang' | string |
| RatedDimensions | E5 | NM/TM | 0..1 | The number of region specific rating dimensions for which content advisory rating is specified. | unsignedByte |
| RatingDimVal | E5 | NM/TM | 1..N | Content advisory rating dimension and rating value for each rated dimension. Contains the following elements:<br>RatingDimension<br>RatingValue | |
| RatingDimension | E6 | NM/TM | 0..1 | Rating dimension index for which the rating value is specified. | unsignedByte |
| RatingValue | E6 | NM/TM | 1 | Rating value for the rating dimension specified in the associated RatingDimension element.<br>Contains the following attribute:<br>xml:lang | unsignedByte |

Content Advisory Ratings elements inside each component in Content fragment

FIG. 19

| Name | Type | Category | Card-inality | Description | Data Type |
|---|---|---|---|---|---|
| atsc:ContentAdvisoryRatings | E4 | NM/TM | 0..1 | Content advisory rating for each rating region. For each rating region rating value is provided for one or more rating dimensions. The content within the string is binary representation of the PSIP Content Advisory Descriptor. | string |

Content Advisory Ratings elements inside each component in Content fragment

FIG. 20

| Name | Type | Category | Cardinality | Description | Data Type |
|---|---|---|---|---|---|
| atsc:ContentAdvisoryRatings | E4 | NM/TM | 0..1 | Content advisory rating for each rating region. For each rating region rating value is provided for one or more rating dimensions. The content within the string is base64 encoded binary data. The binary data is PSIP Content Advisory Descriptor. | base64Binary |

Content Advisory Ratings elements inside each component in Content fragment

FIG. 21

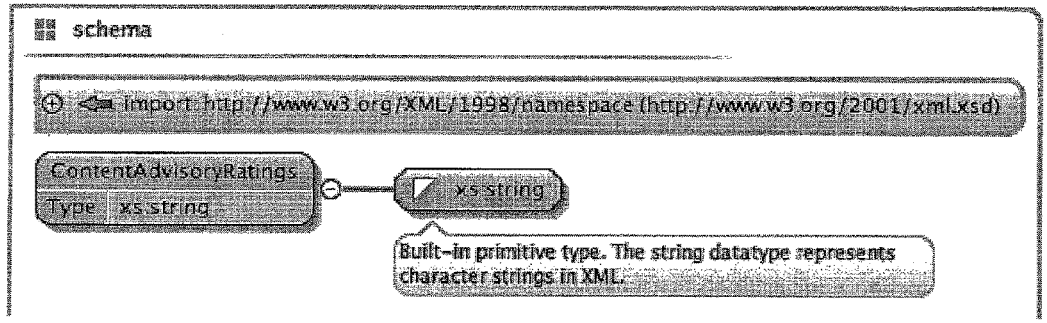

Content Advisory Ratings Information Structure

FIG. 22A

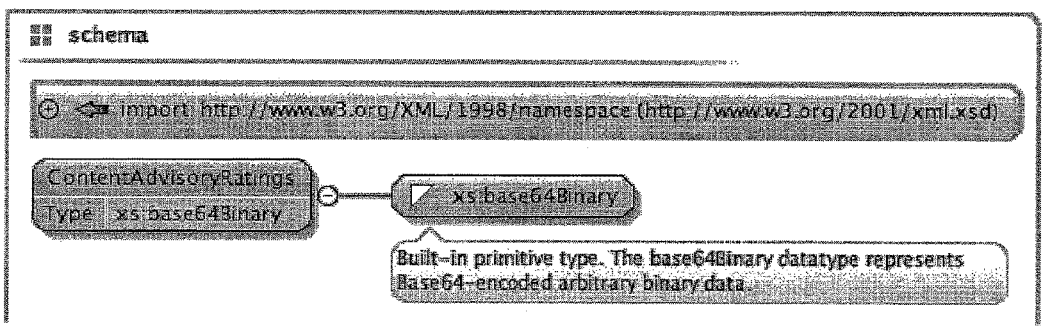

Content Advisory Ratings Information Structure

FIG. 22B

```
<?xml version="1.0" encoding="UTF-8"?>
<xs:schema xmlns:xs="http://www.w3.org/2001/XMLSchema">
    <xs:import namespace="http://www.w3.org/XML/1998/namespace"
        schemaLocation="http://www.w3.org/2001/xml.xsd"/>
    <xs:element name="ContentAdvisoryRatings" type="xs:string"/>
</xs:schema>
```
XML schema for content advisory ratings information

FIG. 23A

```
<?xml version="1.0" encoding="UTF-8"?>
<xs:schema xmlns:xs="http://www.w3.org/2001/XMLSchema">
    <xs:import namespace="http://www.w3.org/XML/1998/namespace"
        schemaLocation="http://www.w3.org/2001/xml.xsd"/>
    <xs:element name="ContentAdvisoryRatings" type="xs:base64Binary"/>
</xs:schema>
```
XML schema for content advisory ratings information

FIG. 23B

| Name | Type | Category | Cardinality | Description | Data Type |
|---|---|---|---|---|---|
| ContentAdvisoryRatings | E1 | NM/TM | 0..N | Content advisory rating one for each rating region.<br>Contains the following elements:<br>RegionIdentifier<br>RatingDescription<br>RatedDimensions<br>RatingDimVal | |
| RegionIdentifier | E2 | NM/TM | 0..1 | Specifies the rating region for which the following rating description and rating dimension, rating value data is specified. If not present the value of RegionIdentifier is inferred to be 0. | unsignedByte |
| RatingDescription | E2 | NM/TM | 1 | Rating description text which represents the rating suitable for on-screen display.<br>Contains the following attribute:<br>xml:lang | string |
| xml:lang | A | NM/TM | 0..1 | The language of the RatingDescription expressed with XML attribute 'xml:lang' | string |
| RatedDimensions | E2 | NM/TM | 0..1 | The number of region specific rating dimensions for which content advisory rating is specified. | unsignedByte |
| RatingDimVal | E2 | NM/TM | 1..N | Content advisory rating dimension and rating value for each rated dimension.<br>Contains the following elements:<br>RatingDimension<br>RatingValue<br>RatingValueString | |
| RatingDimension | E3 | NM/TM | 0..1 | Rating dimension index for which the rating value is specified. | unsignedByte |
| RatingValue | E3 | NM/TM | 1 | Rating value for the rating dimension specified in the associated RatingDimension element.<br>Contains the following attribute:<br>xml:lang | unsignedByte |
| RatingValueString | E3 | NM/TM | 1 | Rating value text string for the rating dimension specified in the associated RatingDimension element. | string |

Content Advisory Ratings in Service Announcement

FIG. 24

| Name | Type | Category | Cardinality | Description | Data Type |
|---|---|---|---|---|---|
| RatingValueString | E3 | NM/TM | 0..1 | Rating value text string for the rating dimension specified in the associated RatingDimension element. | string |

Part of Content Advisory Ratings in Service Announcement

FIG. 25

| Name | Type | Category | Cardinality | Description | Data Type |
|---|---|---|---|---|---|
| xml:lang | A | NM/TM | 0..1 | The language of the RatingDescriptionText expressed with XML attribute 'xml:lang' | string |

Part of Content Advisory Ratings in Service Announcement

FIG. 26

| Name | Type | Category | Cardinality | Description | Data Type |
|---|---|---|---|---|---|
| RRTParentalGuidanceType | E1 | NM/TM | 0..N | Content advisory rating - one for each rating region.<br><br>This element provides definition for specifying a parental guidance rating that conforms to the structure of a single instance of the rating_region loop in the ATSC Content Advisory Descriptor [2]. In any element of RRTParentalGuidanceType type, the ratingRegion value shall match the ratingRegion value of a Rating Region Table approved by a standards or regulatory body applicable to the region of interest, and each ratingDimension of the instance match a ratingDimension that appears in that Rating Region Table, and the ratingValue associated with a ratingDimension in the instance match a ratingValue for the corresponding dimension in that Rating Region Table<br><br>Contains the following elements:<br>Dimension<br>RatingDescriptionText<br>Contains the following attribute:<br>ratingRegion | |
| ratingRegion | A | NM/TM | 0..1 | Code number for the rating region to which this parental guidance rating applies, corresponding to the rating_region field in the ATSC Content Advisory Descriptor [2].<br><br>If not present the value of ratingRegion is inferred to be 0. | unsignedByte |
| Dimension | E2 | NM/TM | 1..N | Content advisory rating dimension and rating value for each rated dimension.<br><br>Rating for specific rating dimension.<br>Contains the following elements:<br>RatingDimension<br>RatingValue<br>RatingValueString | |
| RatingDimension | E3 | NM/TM | 0..1 | Rating dimension index for which the rating value is specified. Code number for the dimension, corresponding to the rating_dimension field in the ATSC Content Advisory Descriptor [2]. In any RRTParentalGuidance element, different Dimension sub-elements shall have different values of the RatingDimension. | unsignedByte |
| RatingValue | E3 | NM/TM | 1 | Rating value for the rating dimension specified in the associated RatingDimension element.<br>Code number for the rating level for the dimension, corresponding to the rating_value field in the ATSC Content Advisory Descriptor [2]. | unsignedByte |
| RatingValueString | E3 | NM/TM | 1 | Rating value text string for the rating dimension specified in the associated RatingDimension element. | String |
| RatingDescriptionText | E2 | NM/TM | 1 | Rating description text which represents the rating suitable for on-screen display.<br><br>Contains the following attribute:<br>xml:lang | string |
| xml:lang | A | NM/TM | 0..1 | The language of the RatingDescription expressed with XML attribute 'xml:lang' | string |

Content Advisory Ratings in Service Announcement

FIG. 27

| Name | Type | Category | Card-inality | Description | Data Type |
|---|---|---|---|---|---|
| RRTParentalGuidanceType | E1 | NM/TM | 0..N | Content advisory rating - one for each rating region.<br><br>Type definition for specifying a parental guidance rating that conforms to the structure of a single instance of the rating_region loop in the ATSC Content Advisory Descriptor [2]. In any element of RRTParentalGuidanceType type, the ratingRegion value shall match the ratingRegion value of a Rating Region Table approved by a standards or regulatory body applicable to the region of interest, and each ratingDimension of the instance match a ratingDimension that appears in that Rating Region Table, and the ratingValue associated with a ratingDimension in the instance match a ratingValue for the corresponding dimension in that Rating Region Table<br><br>Contains the following elements:<br>Dimension<br>RatingDescriptionText<br><br>Contains the following attribute:<br>ratingRegion | |
| ratingRegion | A | NM/TM | 0..1 | Specifies the rating region for which the following rating description, rated dimensions, rating dimension, and rating value data is specified. If not present the value of ratingRegion is inferred to be 0.<br><br>Code number for the rating region to which this parental guidance rating applies, corresponding to the rating_region field in the ATSC Content Advisory Descriptor [2]. | unsignedByte |
| Dimension | E2 | NM/TM | 1..N | Content advisory rating dimension and rating value for each rated dimension.<br><br>Rating for specific rating dimension.<br>Contains the following elements:<br>RatingDimension<br>RatingValue | |
| RatingDimension | E3 | NM/TM | 0..1 | Rating dimension index for which the rating value is specified.<br><br>Code number for the dimension, corresponding to the rating_dimension field in the ATSC Content Advisory Descriptor [2]. In any RRTParentalGuidance element, different Dimension sub-elements shall have different values of the ratingDimension attribute. | unsignedByte |
| RatingValue | E3 | NM/TM | 1 | Rating value for the rating dimension specified in the associated RatingDimension element.<br><br>Code number for the rating level for the dimension, corresponding to the rating_value field in the ATSC Content Advisory Descriptor [2]. | unsignedByte |
| RatingValueString | E3 | NM/TM | 1 | Rating value text string for the rating dimension specified in the associated RatingDimension element. | String |
| RatingDescriptionText | E2 | NM/TM | 1 | Rating description text which represents the rating suitable for on-screen display.<br><br>Text description of the overall rating.<br><br>Contains the following attribute:<br>xml:lang | string |
| xml:lang | A | NM/TM | 0..1 | The language of the RatingDescription expressed with XML attribute 'xml:lang' | string |

Content Advisory Ratings in Service Announcement

FIG. 28

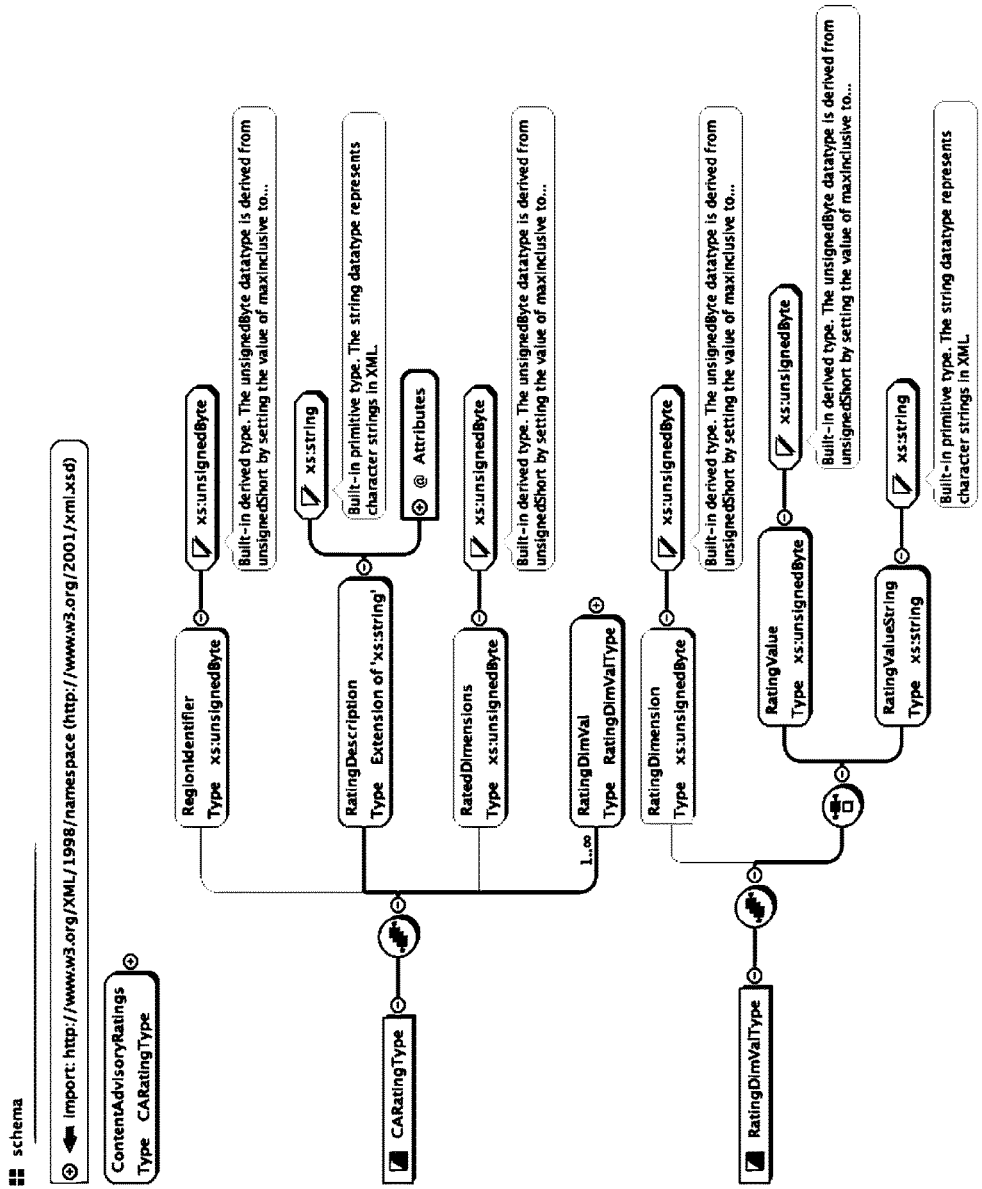
Fig. 29 Content Advisory Ratings Information Structure

Content Advisory Ratings Information Structure

```xml
<?xml version="1.0" encoding="UTF-8"?>
<xs:schema xmlns:xs="http://www.w3.org/2001/XMLSchema">
    <xs:import namespace="http://www.w3.org/XML/1998/namespace"
        schemaLocation="http://www.w3.org/2001/xml.xsd"/>
    <xs:element name="ContentAdvisoryRatings" type="CARatingType"/>
    <xs:complexType name="CARatingType">
        <xs:sequence>
            <xs:element name="RegionIdentifier" type="xs:unsignedByte"
            minOccurs="0" maxOccurs="1"/>
            <xs:element name="RatingDescription" maxOccurs="1">
                <xs:complexType>
                    <xs:simpleContent>
                        <xs:extension base="xs:string">
                            <xs:attribute ref="xml:lang" use="optional"
                            default="en"/>
                        </xs:extension>
                    </xs:simpleContent>
                </xs:complexType>
            </xs:element>
            <xs:element name="RatedDimensions" type="xs:unsignedByte"
            minOccurs="0" maxOccurs="1"/>
            <xs:element name="RatingDimVal" type="RatingDimValType"
            minOccurs="1" maxOccurs="unbounded"/>
        </xs:sequence>
    </xs:complexType>

<xs:complexType name="RatingDimValType">
        <xs:sequence>
            <xs:element name="RatingDimension" type="xs:unsignedByte"
            minOccurs="0" maxOccurs="1"/>
            <xs:choice>

<xs:element name="RatingValue" type="xs:unsignedByte"
            minOccurs="1"/>
                <xs:element name="RatingValueString" type="xs:string"
            minOccurs="1"/>
            </xs:choice>

</xs:sequence>
    </xs:complexType>
</xs:schema>
```

XML schema for content advisory ratings information

FIG. 31

```xml
<?xml version="1.0" encoding="UTF-8"?>
<schema xmlns="http://www.w3.org/2001/XMLSchema">
    <import namespace="http://www.w3.org/XML/1998/namespace"
        schemaLocation="http://www.w3.org/2001/xml.xsd"/>
    <complexType name="RRTParentalGuidanceType">
        <sequence>
            <element name="Dimension" maxOccurs="unbounded">
                <complexType>
                    <sequence>
                        <element name="RatingDimension"
                            type="unsignedByte"
                            minOccurs="0" maxOccurs="1"/>
                        <choice>
                            <element name="RatingValue">
                                <simpleType>
                                    <restriction base="unsignedByte">
                                        <maxInclusive value="15"></maxInclusive>
                                    </restriction>
                                </simpleType>
                            </element>
                            <element name="RatingValueString">
                                <simpleType>
                                    <restriction base="string">
                                        <length value="16" />
                                    </restriction>
                                </simpleType>
                            </element>
                        </choice>
                    </sequence>
                </complexType>
            </element>
            <element name="RatingDescriptionText" maxOccurs="1">
                <complexType><simpleContent>
                    <restriction base="string">
                        <length value="16" />
                    </restriction>
                    <extension base="string">
                        <attribute ref="xml:lang" use="optional" default="en"/>
                    </extension>
                </simpleContent></complexType>
            </element>
        </sequence>
        <attribute name="ratingRegion" type="unsignedByte" />
    </complexType>
</schema>
```

XML schema for content advisory ratings information

FIG. 32

| Element or Attribute | Cardinality | Data Type | Description |
|---|---|---|---|
| RatingRegionTables | 1 | | |
| RatingRegionTable | 1..2 | | One or two Rating Region Tables. |
| RegionIdentifier | 1 | | Information about the region |
| @regionIdentifier | 1 | xs:unsignedByte | Identifies the rating region described. |
| RegionIdText | 1..N | TextType | Human-readable string describing the rating region, e.g. "Canada" See Table 2 |
| Dimension | 1..N | | One or more elements, each describing one rating dimension in the rating region |
| @dimensionLevels | 1 | xs:unsignedByte | The number of levels for content advisory in this dimension. Shall not be zero. |
| DimensionTitle | 0..N | TextType | Human-readable string describing the dimension. See Table 2 |
| @dimensionGraduated | 0..1 | xs:boolean | If the dimension describes ratings in a graduated scale, the value of dimensionGraduated shall be TRUE, otherwise the value of dimensionGraduated shall be FALSE. Default value (if not present) shall be FALSE. When ratings are defined to be on a graduated scale, higher rating values represent increasing levels of rated content within the dimension. |
| Rating | 1..N | | Definition of each rating in the Dimension |
| @ratingValue | 1 | xs:unsignedByte | The rating level value in integer form |
| RatingValueAbbrev | 1..N | TextType | Abbreviated human-readable string describing the rating value. See Table 2 |
| RatingValueString | 1..N | TextType | Human-readable string describing the rating value. Table 2 |

FIG. 33

| Element or Attribute | Cardinality | Data Type | Description |
|---|---|---|---|
| TextType | 1 | xs:string | |
| @lang | 0..1 | xs:lang | The language of the string specified according to XML datatypes as per XML Schema Part 2 defined at http://www.w3.org/TR/xmlschema-2/ |

```xml
<?xml version="1.0" encoding="UTF-8"?>
<xs:schema xmlns:xs="http://www.w3.org/2001/XMLSchema"
    elementFormDefault="unqualified"
    attributeFormDefault="unqualified">
    <xs:import namespace="http://www.w3.org/XML/1998/namespace"
        schemaLocation="http://www.w3.org/2001/xml.xsd"/>
    <xs:element name="RatingRegionTables" type="RRsType"/>
    <xs:complexType name="RRsType">
        <xs:sequence>
            <xs:element name="RatingRegionTable" type="RatingRegionTableType" minOccurs="1" maxOccurs="2"/>
        </xs:sequence>
    </xs:complexType>

<xs:complexType name="RatingRegionTableType">
        <xs:sequence>
            <xs:element name="RegionIdentifier" type="RegionIdentifierType" minOccurs="1" maxOccurs="1"/>
            <xs:element name="RegionIdText" type="TextType" minOccurs="1" maxOccurs="unbounded"/>
            <xs:element name="Dimension" type="DimensionType" minOccurs="1" maxOccurs="unbounded"/>
        </xs:sequence>
    </xs:complexType>
    <xs:complexType name="RegionIdentifierType">
        <xs:attribute name="regionIdentifier" type="RIType"/>
    </xs:complexType>
    <xs:simpleType name="RIType">
        <xs:restriction base="xs:unsignedByte">
            <xs:minInclusive value="1"/>
        </xs:restriction>
    </xs:simpleType>
    <xs:complexType name="DimensionType">
        <xs:sequence>
            <xs:element name="DimensionTitle" type="TextType" minOccurs="0" maxOccurs="unbounded"/>
            <xs:element name="Rating" type="RatingType" minOccurs="1" maxOccurs="unbounded"/>
        </xs:sequence>
        <xs:attribute name="dimensionLevels" type="DimLevelType" use="required"/>
        <xs:attribute name="dimensionsGraduated" type="xs:boolean" use="optional" default="false"/>
    </xs:complexType>
    <xs:simpleType name="DimLevelType">
        <xs:restriction base="xs:unsignedByte">
            <xs:minInclusive value="1"/>
        </xs:restriction>
    </xs:simpleType>
    <xs:complexType name="RatingType">
        <xs:sequence>
            <xs:element name="RatingValueAbbrev" type="TextType" minOccurs="1" maxOccurs="unbounded"/>
```

[Fig. 35(2)]

```
            <xs:element name="RatingValueString" type="TextType" minOccurs="1"
maxOccurs="unbounded"/>
        </xs:sequence>
        <xs:attribute name="ratingValue" type="xs:unsignedByte"
use="required"/>
    </xs:complexType>
    <xs:complexType name="TextType">
        <xs:simpleContent>
            <xs:extension base="xs:string">
                <xs:attribute name="lang" type="xs:language"
use="optional" default="EN"/>
            </xs:extension>
        </xs:simpleContent>
    </xs:complexType>
</xs:schema>
```

| Element or Attribute | Cardinality | Data Type | Description |
|---|---|---|---|
| RatingRegionTables | 1 | | |
|   RatingRegionTable | 1..2 | | One or two Rating Region Tables. |
|     RegionIdentifier | 1 | | Information about the region |
|       @regionIdentifier | 1 | xs:unsignedByte | Identifies the rating region described. |
|       RegionIdText | 1..N | TextType | Human-readable string describing the rating region, e.g. "Canada" See Table 2 |
|     Dimension | 1..N | | One or more elements, each describing one rating dimension in the rating region |
|       @dimensionLevels | 1 | xs:unsignedByte | The number of levels for content advisory in this dimension. Shall not be zero. |
|       DimensionTitle | 0..N | TextType | Human-readable string describing the dimension. See Table 2 |
|       @dimensionGraduated | 0..1 | xs:boolean | If the dimension describes ratings in a graduated scale, the value of dimensionGraduated shall be TRUE, otherwise the value of dimensionGraduated shall be FALSE. Default value (if not present) shall be FALSE. When ratings are defined to be on a graduated scale, higher rating values represent increasing levels of rated content within the dimension. |
|       Rating | 1..N | | Definition of each rating in the Dimension |
|         RatingValue | 1 | xs:unsignedByte | The rating level value in integer form |
|         RatingValueAbbrev | 1 | TextType | Abbreviated human-readable string describing the rating value. See Table 2 |
|         RatingValueString | 1 | TextType | Human-readable string describing the rating value. Table 2 |

```xml
<?xml version="1.0" encoding="UTF-8"?>
<xs:schema xmlns:xs="http://www.w3.org/2001/XMLSchema"
    elementFormDefault="unqualified"
    attributeFormDefault="unqualified">
    <xs:import namespace="http://www.w3.org/XML/1998/namespace"
        schemaLocation="http://www.w3.org/2001/xml.xsd"/>
    <xs:element name="RatingRegionTables" type="RRsType"/>
    <xs:complexType name="RRsType">
        <xs:sequence>
            <xs:element name="RatingRegionTable" type="RatingRegionTableType" minOccurs="1" maxOccurs="2"/>
        </xs:sequence>
    </xs:complexType>

<xs:complexType name="RatingRegionTableType">
        <xs:sequence>
            <xs:element name="RegionIdentifier" type="RegionIdentifierType" minOccurs="1" maxOccurs="1"/>
            <xs:element name="RegionIdText" type="TextType" minOccurs="1" maxOccurs="unbounded"/>
            <xs:element name="Dimension" type="DimensionType" minOccurs="1" maxOccurs="unbounded"/>
        </xs:sequence>
    </xs:complexType>
    <xs:complexType name="RegionIdentifierType">
        <xs:attribute name="regionIdentifier" type="RIType"/>
    </xs:complexType>
    <xs:simpleType name="RIType">
        <xs:restriction base="xs:unsignedByte">
            <xs:minInclusive value="1"/>
        </xs:restriction>
    </xs:simpleType>
    <xs:complexType name="DimensionType">
        <xs:sequence>
            <xs:element name="DimensionTitle" type="TextType" minOccurs="0" maxOccurs="unbounded"/>
            <xs:element name="Rating" type="RatingType" minOccurs="1" maxOccurs="unbounded"/>
        </xs:sequence>
        <xs:attribute name="dimensionLevels" type="DimLevelType" use="required"/>
        <xs:attribute name="dimensionsGraduated" type="xs:boolean" use="optional" default="false"/>
    </xs:complexType>
    <xs:simpleType name="DimLevelType">
        <xs:restriction base="xs:unsignedByte">
            <xs:minInclusive value="1"/>
        </xs:restriction>
    </xs:simpleType>
    <xs:complexType name="RatingType">
        <xs:sequence>
            <xs:element name="RatingValue" type="xs:unsignedByte" minOccurs="1" maxOccurs="1"/>
```

[Fig. 37(2)]

```
            <xs:element name="RatingValueAbbrev" type="TextType" minOccurs="1"
maxOccurs="1"/>
            <xs:element name="RatingValueString" type="TextType" minOccurs="1"
maxOccurs="1"/>
        </xs:sequence>

</xs:complexType>
    <xs:complexType name="TextType">
            <xs:simpleContent>
                <xs:extension base="xs:string">
                    <xs:attribute name="lang" type="xs:language"
use="optional" default="EN"/>
                </xs:extension>
            </xs:simpleContent>
    </xs:complexType>
</xs:schema>
```

| Element or Attribute | Cardinality | Data Type | Description |
| --- | --- | --- | --- |
| RatingRegionTables | 1 | | |
|   RatingRegionTable | 1..2 | | One or two Rating Region Tables. |
|     RegionIdentifier | 1 | | Information about the region |
|       @regionIdentifier | 1 | xs:unsignedByte | Identifies the rating region described. |
|     RegionIdText | 1..N | TextType | Human-readable string describing the rating region, e.g. "Canada" See Table 2 |
|     Dimension | 1..N | | One or more elements, each describing one rating dimension in the rating region |
|       @dimensionLevels | 1 | xs:unsignedByte | The number of levels for content advisory in this dimension. Shall not be zero. |
|       DimensionTitle | 0..N | TextType | Human-readable string describing the dimension. See Table 2 |
|       @dimensionGraduated | 0..1 | xs:boolean | If the dimension describes ratings in a graduated scale, the value of dimensionGraduated shall be TRUE, otherwise the value of dimensionGraduated shall be FALSE. Default value (if not present) shall be FALSE.<br>When ratings are defined to be on a graduated scale, higher rating values represent increasing levels of rated content within the dimension. |
|       Rating | 1..N | | Definition of each rating in the Dimension |
|         @ratingValue | 1 | xs:unsignedByte | The rating level value in integer form |
|         @ratingValueAbbrev | 1 | xs:string | Abbreviated human-readable string describing the rating value. See Table 2 |
|         @ratingValueString | 1 | xs:string | Human-readable string describing the rating value. Table 2 |

```xml
<?xml version="1.0" encoding="UTF-8"?>
<xs:schema xmlns:xs="http://www.w3.org/2001/XMLSchema"
    elementFormDefault="unqualified"
    attributeFormDefault="unqualified">
    <xs:import namespace="http://www.w3.org/XML/1998/namespace"
        schemaLocation="http://www.w3.org/2001/xml.xsd"/>
    <xs:element name="RatingRegionTables" type="RRsType"/>
    <xs:complexType name="RRsType">
        <xs:sequence>
            <xs:element name="RatingRegionTable" type="RatingRegionTableType" minOccurs="1" maxOccurs="2"/>
        </xs:sequence>
    </xs:complexType>

<xs:complexType name="RatingRegionTableType">
        <xs:sequence>
            <xs:element name="RegionIdentifier" type="RegionIdentifierType" minOccurs="1" maxOccurs="1"/>
            <xs:element name="RegionIdText" type="TextType" minOccurs="1" maxOccurs="unbounded"/>
            <xs:element name="Dimension" type="DimensionType" minOccurs="1" maxOccurs="unbounded"/>
        </xs:sequence>
    </xs:complexType>
    <xs:complexType name="RegionIdentifierType">
        <xs:attribute name="regionIdentifier" type="RIType"/>
    </xs:complexType>
    <xs:simpleType name="RIType">
        <xs:restriction base="xs:unsignedByte">
            <xs:minInclusive value="1"/>
        </xs:restriction>
    </xs:simpleType>
    <xs:complexType name="DimensionType">
        <xs:sequence>
            <xs:element name="DimensionTitle" type="TextType" minOccurs="0" maxOccurs="unbounded"/>
            <xs:element name="Rating" type="RatingType" minOccurs="1" maxOccurs="unbounded"/>
        </xs:sequence>
        <xs:attribute name="dimensionLevels" type="DimLevelType" use="required"/>
        <xs:attribute name="dimensionsGraduated" type="xs:boolean" use="optional" default="false"/>
    </xs:complexType>
    <xs:simpleType name="DimLevelType">
        <xs:restriction base="xs:unsignedByte">
            <xs:minInclusive value="1"/>
        </xs:restriction>
    </xs:simpleType>
    <xs:complexType name="RatingType">
        <xs:attribute name="ratingValue" type="xs:unsignedByte" use="required"/>
        <xs:attribute name="ratingValueAbbrev" type="xs:string" use="required"/>
        <xs:attribute name="ratingValueString" type="xs:string"
```

[Fig. 40(2)]

```
         use="required"/>
      </xs:complexType>
      <xs:complexType name="TextType">
            <xs:simpleContent>
                  <xs:extension base="xs:string">
                        <xs:attribute name="lang" type="xs:language"
use="optional" default="EN"/>
                  </xs:extension>
            </xs:simpleContent>
      </xs:complexType>
</xs:schema>
```

CONTENT ADVISORY RATINGS INFORMATION

TECHNICAL FIELD

The present disclosure relates generally to a service guide.

BACKGROUND ART

A broadcast service is capable of being received by users having broadcast receivers. Broadcast services can be roughly divided into two categories, namely, a radio broadcast service carrying only audio and a multimedia broadcast service carrying audio, video and data. Such broadcast services have developed from analog services to digital services. More recently, various types of broadcasting systems (such as a cable broadcasting system, a satellite broadcasting system, an Internet based broadcasting system, and a hybrid broadcasting system using a cable network, Internet, and/or a satellite) provide high quality audio and video broadcast services along with a high-speed data service. Also, broadcast services include sending and/or receiving audio, video, and/or data directed to an individual computer and/or group of computers and/or one or more mobile communication devices.

In addition to more traditional stationary receiving devices, mobile communication devices are likewise configured to support such services. Such configured mobile devices have facilitated users to use such services while on the move, such as mobile phones. An increasing need for multimedia services has resulted in various wireless and/or broadcast services for mobile communications and general wire communications. Further, this convergence has merged the environment for different wire and wireless broadcast services.

Open Mobile Alliance (OMA), is a standard for inter-working between individual mobile solutions, serves to define various application standards for mobile software and Internet services. OMA Mobile Broadcast Services Enabler Suite (BCAST) is a specification designed to support mobile broadcast technologies. The OMA BCAST defines technologies that provide IP based mobile content delivery, which includes a variety of functions such as a service guide, downloading and streaming, service and content protection, service subscription, and roaming.

The foregoing and other objectives, features, and advantages of the invention will be more readily understood upon consideration of the following detailed description of the invention, taken in conjunction with the accompanying drawings.

SUMMARY OF INVENTION

One embodiment of the present invention relates to: a method for decoding a service guide associated with a video bitstream comprising: (a) receiving a fragment within said service guide; (b) receiving content advisory ratings element within said fragment that indicates advisory ratings for content of said video bitstream; (c) said content advisory ratings element includes at least one of: (i) a region identifier that specifies a rating region for a (1) rating description, (2) a rating dimension, and (3) a rating value; (ii) said rating description that represents a rating suitable for on-screen display; (iii) a rated dimensions that represents the number of region specific rating dimensions for which content advisory rating is specified; (iv) a rating dimensions value that represents rating dimension and a rating value for each said rating dimension; (v) said rating dimension that represents an index for which said rating value is specified; (vi) said rating value which represents a value for said rating dimension; (d) decoding said service guide.

BRIEF DESCRIPTION OF DRAWINGS

FIG. 4 illustrates a description scheme.

FIG. 5 illustrates content advisory ratings in a service announcement.

FIG. 7B illustrates a region identifier.

FIG. 7C illustrates a rating dimension.

FIG. 8 illustrates an XML schema for content advisory ratings.

FIG. 9A illustrates portion of an alternative XML schema for content advisory ratings.

FIG. 9B illustrates portion of an alternative XML schema for content advisory ratings.

FIG. 10A illustrates content advisory ratings in a service announcement.

FIG. 10B illustrates content advisory ratings in a service announcement.

FIG. 11 illustrates Binary and/or Stream Syntax for Content Advisory Ratings Description.

FIG. 12 illustrates Content Advisory Ratings in Service Announcement inside a Service fragment FIG. 13 illustrates Content Advisory Ratings in Service Announcement inside a Service fragment FIG. 14 illustrates Content Advisory Ratings in Service Announcement inside a Service fragment FIG. 15 illustrates Content Advisory Ratings in Service Announcement inside a Content fragment FIG. 16 illustrates Content Advisory Ratings in Service Announcement inside a Content fragment FIG. 17 illustrates Content Advisory Ratings in Service Announcement inside a Content fragment FIG. 18(1) illustrates Content Advisory Ratings in Service Announcement inside each component Content fragment FIG. 18(2) illustrates Content Advisory Ratings in Service Announcement inside each component Content fragment FIG. 18(3) illustrates Content Advisory Ratings in Service Announcement inside each component Content fragment FIG. 19 illustrates Content Advisory Ratings element inside each component Content fragment FIG. 20 illustrates Content Advisory Ratings element inside each component Content fragment FIG. 21 illustrates Content Advisory Ratings element inside each component Content fragment FIG. 22A illustrates a content advisory ratings information structure.

FIG. 22B illustrates a content advisory ratings information structure.

FIG. 23A illustrates an XML schema for content advisory ratings information.

FIG. 23B illustrates an XML schema for content advisory ratings information.

FIG. 24 illustrates content advisory ratings in a service announcement.

FIG. 25 illustrates part of content advisory ratings in a service announcement.

FIG. 26 illustrates part of content advisory ratings in a service announcement.

FIG. 27 illustrates content advisory ratings in a service announcement.

FIG. 28 illustrates content advisory ratings in a service announcement.

FIG. 29 illustrates a content advisory ratings information structure.

FIG. 31 illustrates an XML schema for content advisory ratings information.

FIG. 32 illustrates an XML schema for content advisory ratings information.

FIG. 33 illustrates a Rating Region Table.

FIG. 34 illustrates a TextType element.

FIG. 35(1) illustrates a XML schema for Rating Region Table.

FIG. 35(2) illustrates a XML schema for Rating Region Table.

FIG. 36 illustrates a Rating Region Table.

FIG. 37(1) illustrates a XML schema for Rating Region Table.

FIG. 37(2) illustrates a XML schema for Rating Region Table.

FIG. 39 illustrates a Rating Region Table.

FIG. 40(1) illustrates a XML schema for Rating Region Table.

FIG. 40(2) illustrates a XML schema for Rating Region Table.

DESCRIPTION OF EMBODIMENTS

Figure 1:
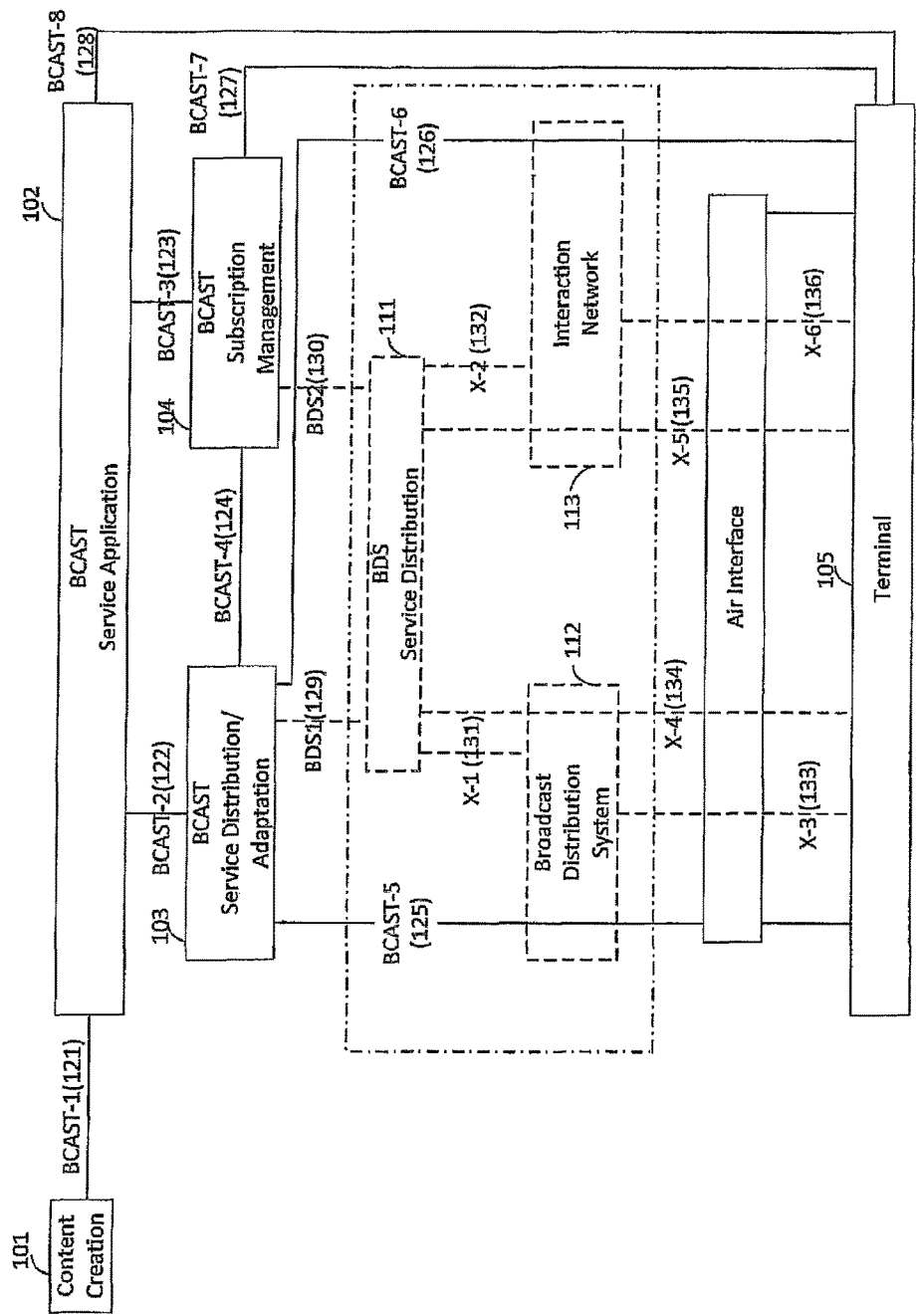
FIG. 1 is a block diagram illustrating logical architecture of a BCAST system specified by OMA BCAST working group in an application layer and a transport layer.

Referring to FIG. 1, a logical architecture of a broadcast system specified by OMA (Open Mobile Alliance) BCAST may include an application layer and a transport layer. The logical architecture of the BCAST system may include a Content Creation (CC) 101, a BCAST Service Application 102, a BCAST Service Distribution Adaptation (BSDA) 103, a BCAST Subscription Management (BSM) 104, a Terminal 105, a Broadcast Distribution System (BDS) Service Distribution 111, a BDS 112, and an Interaction Network 113. It is to be understood that the broadcast system and/or receiver system may be reconfigured, as desired. It is to be understood that the broadcast system and/or receiver system may include additional elements and/or fewer elements, as desired.

In general, the Content Creation 101 may provide content that is the basis of BCAST services. The content may include files for common broadcast services, e.g., data for a movie including audio and video. The Content Creation 101 provides a BCAST Service Application 102 with attributes for the content, which are used to create a service guide and to determine a transmission bearer over which the services will be delivered.

In general, the BCAST Service Application 102 may receive data for BCAST services provided from the Content Creation 101, and converts the received data into a form suitable for providing media encoding, content protection, interactive services, etc. The BCAST Service Application 102 provides the attributes for the content, which is received from the Content Creation 101, to the BSDA 103 and the BSM 104.

In general, the BSDA 103 may perform operations, such as file and/or streaming delivery, service gathering, service protection, service guide creation and/or delivery and service notification, using the BCAST service data provided from the BCAST Service Application 102. The BSDA 103 adapts the services to the BDS 112.

In general, the BSM 104 may manage, via hardware or software, service provisioning, such as subscription and charging-related functions for BCAST service users, information provisioning used for BCAST services, and mobile terminals that receive the BCAST services.

In general, the Terminal 105 may receive content and/or service guide and program support information, such as content protection, and provides a broadcast service to a user. The BDS Service Distribution 111 delivers mobile broadcast services to a plurality of terminals through mutual communication with the BDS 112 and the Interaction Network 113.

In general, the BDS 112 may deliver mobile broadcast services over a broadcast channel, and may include, for example, a Multimedia Broadcast Multicast Service (MBMS) by 3rd Generation Project Partnership (3GPP), a Broadcast Multicast Service (BCMCS) by 3rd Generation Project Partnership 2 (3GPP2), a DVB-Handheld (DVB-H) by Digital Video Broadcasting (DVB), or an Internet Protocol (IP) based broadcasting communication network. The Interaction Network 113 provides an interaction channel, and may include, for example, a cellular network.

The reference points, or connection paths between the logical entities of FIG. 1, may have a plurality of interfaces, as desired. The interfaces are used for communication between two or more logical entities for their specific purposes. A message format, a protocol and the like are applied for the interfaces. In some examples, there are no logical interfaces between one or more different functions.

BCAST-1 121 is a transmission path for content and content attributes, and BCAST-2 122 is a transmission path for a content-protected or content-unprotected BCAST service, attributes of the BCAST service, and content attributes.

BCAST-3 123 is a transmission path for attributes of a BCAST service, attributes of content, user preference and/or subscription information, a user request, and a response to the request. BCAST-4 124 is a transmission path for a notification message, attributes used for a service guide, and a key used for content protection and service protection.

BCAST-5 125 is a transmission path for a protected BCAST service, an unprotected BCAST service, a content-protected BCAST service, a content-unprotected BCAST service, BCAST service attributes, content attributes, a notification, a service guide, security materials such as a Digital Right Management (DRM) Right Object (RO) and key values used for BCAST service protection, and data and signaling transmitted through a broadcast channel.

BCAST-6 126 is a transmission path for a protected BCAST service, an unprotected BCAST service, a content-protected BCAST service, a content-unprotected BCAST service, BCAST service attributes, content attributes, a notification, a service guide, security materials such as a DRM RO and key values used for BCAST service protection, and data and signaling transmitted through an interaction channel.

BCAST-7 127 is a transmission path for service provisioning, subscription information, device management, and user preference information transmitted through an interaction channel for control information related to receipt of security materials, such as a DRM RO and key values used for BCAST service protection.

BCAST-8 128 is a transmission path through which user data for a BCAST service is provided. BDS-1 129 is a transmission path for a protected BCAST service, an unprotected BCAST service, BCAST service attributes, content attributes, a notification, a service guide, and security materials, such as a DRM RO and key values used for BCAST service protection.

BDS-2 130 is a transmission path for service provisioning, subscription information, device management, and security materials, such as a DRM RO and key values used for BCAST service protection.

X-1 131 is a reference point between the BDS Service Distribution 111 and the BDS 112. X-2 132 is a reference point between the BDS Service Distribution 111 and the Interaction Network 113. X-3 133 is a reference point between the BDS 112 and the Terminal 105. X-4 134 is a reference point between the BDS Service Distribution 111 and the Terminal 105 over a broadcast channel. X-5 135 is a reference point between the BDS Service Distribution 111 and the Terminal 105 over an interaction channel. X-6 136 is a reference point between the Interaction Network 113 and the Terminal 105.

Figure 2:
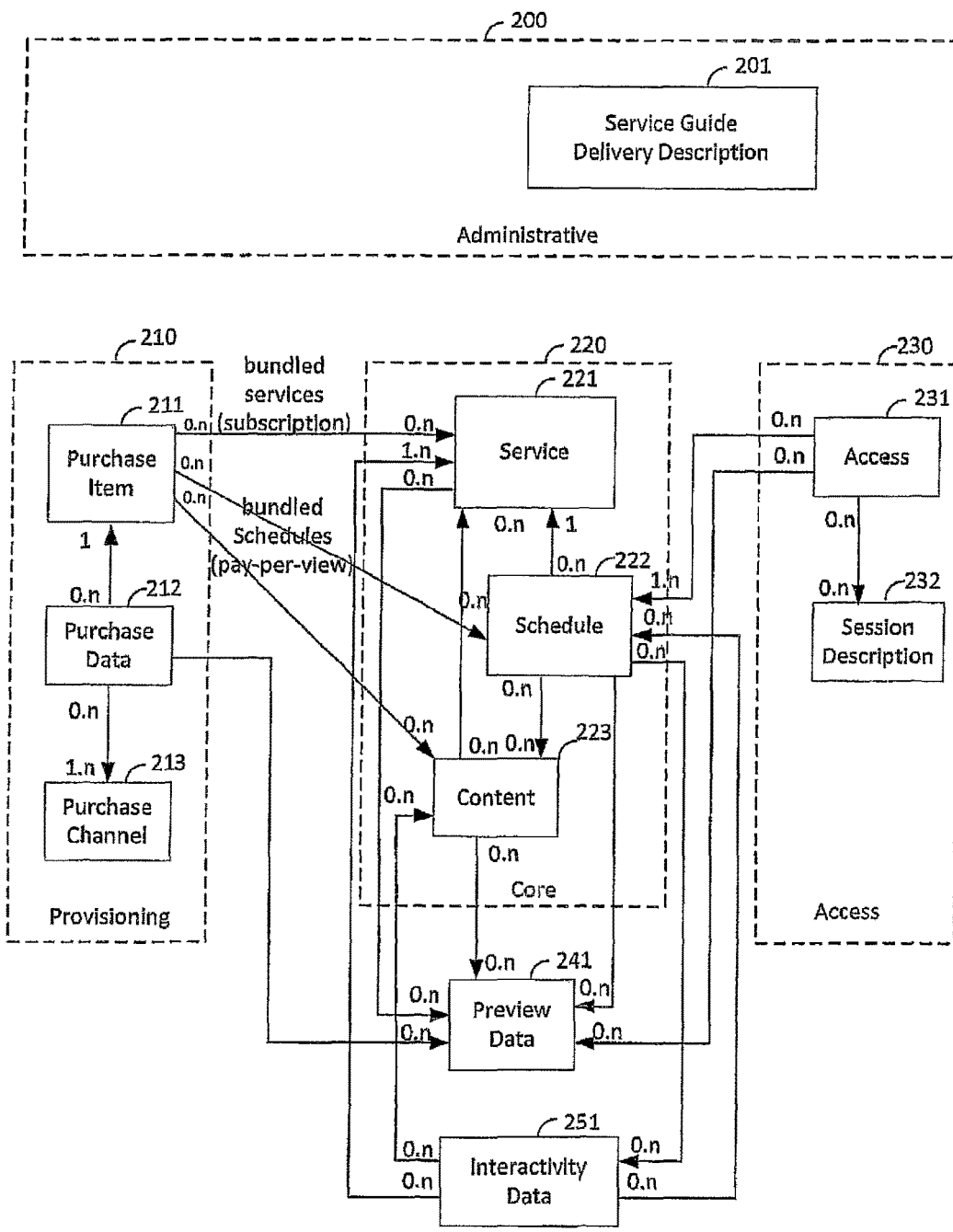
FIG. 2 is a diagram illustrating a structure of a service guide for use in the OMA BCAST system.

Referring to FIG. 2, an exemplary service guide for the OMA BCAST system is illustrated. For purposes of illustration, the solid arrows between fragments indicate the reference directions between the fragments. It is to be understood that the service guide system may be reconfigured, as desired. It is to be understood that the service guide system may include additional elements and/or fewer elements, as desired. It is to be understood that functionality of the elements may be modified and/or combined, as desired.

Figure 2A:
FIG. 2A is a diagram showing cardinalities and reference direction between service guide fragments.

FIG. 2A is a diagram showing cardinalities and reference direction between service guide fragments. The meaning of the cardinalities shown in the FIG. 2 is the following: One instantiation of Fragment A as in FIG. 2A references c to d instantiations of Fragment B. If c=d, d is omitted. Thus, if c>0 and Fragment A exists, at least c instantiation of Fragment B may also exist, but at most d instantiations of Fragment B may exist. Vice versa, one instantiation of Fragment B is referenced by a to b instantiations of Fragment A. If a=b, b is omitted. The arrow connection from Fragment A pointing to Fragment B indicates that Fragment A contains the reference to Fragment B.

With respect to FIG. 2, in general, the service guide may include an Administrative Group 200 for providing basic information about the service guide, a Provisioning Group 210 for providing subscription and purchase information, a Core Group 220 that acts as a core part of the service guide, and an Access Group 230 for providing access information that control access to services and content.

The Administrative Group 200 may include a Service Guide Delivery Descriptor (SGDD) 201. The Provision Group 210 may include a Purchase Item 211, a Purchase Data 212, and a Purchase Channel 213. The Core Group 220 may include a Service 221, a Schedule 222, and a Content 223. The Access Group 230 may include an Access 231 and a Session Description 232.

The service guide may further include Preview Data 241 and Interactivity Data 251 in addition to the Administrative Group 200, Provision Group 210, Core Group 220, and Access Group 230.

The aforementioned components may be referred to as basic units or fragments constituting aspects of the service guide, for purposes of identification.

The SGDD 201 may provide information about a delivery session where a Service Guide Delivery Unit (SGDU) is located. The SGDU is a container that contains one or more of a Purchase Item 211, Purchase Data 212, Purchase Channel 213, Service 221, Schedule 222, Content 223, Access 231, Session Description 232, Preview Data 241, and/or Interactivity Data 251, which constitute the service guide. The SGDD may also provide the information on the entry points for receiving the grouping information and notification messages.

The Service 221, which is an upper aggregate of the content included in the broadcast service, may include information on service content, genre, service location, etc. In general, the 'Service' fragment describes at an aggregate level the content items which comprise a broadcast service. The service may be delivered to the user using multiple means of access, for example, the broadcast channel and the interactive channel. The service may be targeted at a certain user group or geographical area. Depending on the type of the service it may have interactive part(s), broadcast-only part(s), or both. Further, the service may include components not directly related to the content but to the functionality of the service such as purchasing or subscription information. As the part of the Service Guide (SG), the 'Service' fragment forms a central hub referenced by the other fragments including 'Access', 'Schedule', 'Content' and 'PurchaseItem' fragments. In addition to that, the 'Service' fragment may reference 'PreviewData' fragment. It may be referenced by none or several of each of these fragments. Together with the associated fragments the terminal may determine the details associated with the service at any point of time. These details may be summarized into a user-friendly display, for example, of what, how and when the associated content may be consumed and at what cost.

The Access 231 may provide access-related information for allowing the user to view the service and delivery method, and session information associated with the corresponding access session. As such, the 'Access' fragment describes how the service may be accessed during the lifespan of the service. This fragment contains or references Session Description information and indicates the delivery method. One or more 'Access' fragments may reference a 'Service' fragment, offering alternative ways for accessing or interacting with the associated service. For the Terminal, the 'Access' fragment provides information on what capabilities are required from the terminal to receive and render the service. The 'Access' fragment provides Session Description parameters either in the form of inline text, or through a pointer in the form of a Uniform Resource Identifier (URI) to a separate Session Description. Session Description information may be delivered over either the broadcast channel or the interaction channel.

The Session Description 232 may be included in the Access 231, and may provide location information in a Uniform Resource Identifier form so that the terminal may detect information on the Session Description 232. The Session Description 232 may provide address information, codec information, etc., about multimedia content existing in the session. As such, the 'SessionDescription' is a Service Guide fragment which provides the session information for access to a service or content item. Further, the Session Description may provide auxiliary description information, used for associated delivery procedures. The Session Description information is provided using either syntax of Session Description Protocol (SDP) in text format, or through a 3GPP MBMS User Service Bundle Description (USBD) [3GPP TS 26.346]. Auxiliary description information is provided in XML format and contains an Associated Delivery Description as specified in [BCAST10-Distribution]. Note that in case SDP syntax is used, an alternative way to deliver the Session Description is by encapsulating the SDP in text format in 'Access' fragment. Note that Session Description may be used for Service Guide delivery as well as for the content sessions.

The Purchase Item 211 may provide a bundle of service, content, time, etc., to help the user subscribe to or purchase the Purchase Item 211. As such, the 'PurchaseItem' fragment represents a group of one or more services (i.e. a service bundle) or one or more content items, offered to the end user for free, for subscription and/or purchase. This fragment can be referenced by 'PurchaseData' fragment(s) offering more information on different service bundles. The 'PurchaseItem' fragment may be also associated with: (1) a 'Service' fragment to enable bundled services subscription and/or, (2) a 'Schedule' fragment to enable consuming a certain service or content in a certain timeframe (pay-per-view functionality) and/or, (3) a 'Content' fragment to enable purchasing a single content file related to a service, (4) other 'PurchaseItem' fragments to enable bundling of purchase items.

The Purchase Data 212 may include detailed purchase and subscription information, such as price information and promotion information, for the service or content bundle. The Purchase Channel 213 may provide access information for subscription or purchase. As such, the main function of the 'PurchaseData' fragment is to express available pricing information about the associated purchase item. The 'PurchaseData' fragment collects the information about one or several purchase channels and may be associated with PreviewData specific to a certain service or service bundle. It carries information about pricing of a service, a service bundle, or, a content item. Also, information about promotional activities may be included in this fragment. The SGDD may also provide information regarding entry points for receiving the service guide and grouping information about the SGDU as the container.

The Preview Data 241 may be used to provide preview information for a service, schedule, and content. As such, 'PreviewData' fragment contains information that is used by the terminal to present the service or content outline to users, so that the users can have a general idea of what the service or content is about. 'PreviewData' fragment can include simple texts, static images (for example, logo), short video clips, or even reference to another service which could be a low bit rate version for the main service. 'Service', 'Content', 'PurchaseData', 'Access' and 'Schedule' fragments may reference 'PreviewData' fragment.

The Interactivity Data 251 may be used to provide an interactive service according to the service, schedule, and content during broadcasting. More detailed information about the service guide can be defined by one or more elements and attributes of the system. As such, the InteractivityData contains information that is used by the terminal to offer interactive services to the user, which is associated with the broadcast content. These interactive services enable users to e.g. vote during TV shows or to obtain content related to the broadcast content. 'InteractivityData' fragment points to one or many 'InteractivityMedia' documents that include xhtml files, static images, email template, Short Message Service (SMS) template, Multimedia Messaging Service (MMS) template documents, etc. The 'InteractivityData' fragment may reference the 'Service', 'Content' and 'Schedule' fragments, and may be referenced by the 'Schedule' fragment.

The 'Schedule' fragment defines the timeframes in which associated content items are available for streaming, downloading and/or rendering. This fragment references the 'Service' fragment. If it also references one or more 'Content' fragments or 'InterativityData' fragments, then it defines the valid distribution and/or presentation timeframe of those content items belonging to the service, or the valid distribution timeframe and the automatic activation time of the InteractivityMediaDocuments associated with the service. On the other hand, if the 'Schedule' fragment does not reference any 'Content' fragment(s) or 'InteractivityData' fragment(s), then it defines the timeframe of the service availability which is unbounded.

The 'Content' fragment gives a detailed description of a specific content item. In addition to defining a type, description and language of the content, it may provide information about the targeted user group or geographical area, as well as genre and parental rating. The 'Content' fragment may be referenced by Schedule, PurchaseItem or 'InteractivityData' fragment. It may reference 'PreviewData' fragment or 'Service' fragment.

The 'PurchaseChannel' fragment carries the information about the entity from which purchase of access and/or content rights for a certain service, service bundle or content item may be obtained, as defined in the 'PurchaseData' fragment. The purchase channel is associated with one or more Broadcast Subscription Managements (BSMs). The terminal is only permitted to access a particular purchase channel if it is affiliated with a BSM that is also associated with that purchase channel. Multiple purchase channels may be associated to one 'PurchaseData' fragment. A certain end-user can have a "preferred" purchase channel (e.g. a mobile operator) to which purchase requests should be directed. The preferred purchase channel may even be the only channel that an end-user is allowed to use.

The ServiceGuideDeliveryDescriptor is transported on the Service Guide Announcement Channel, and informs the terminal the availability, metadata and grouping of the fragments of the Service Guide in the Service Guide discovery process. A SGDD allows quick identification of the Service Guide fragments that are either cached in the terminal or being transmitted. For that reason, the SGDD is preferably repeated if distributed over broadcast channel. The SGDD also provides the grouping of related Service Guide fragments and thus a means to determine completeness of such group. The ServiceGuideDeliveryDescriptor is especially useful if the terminal moves from one service coverage area to another. In this case, the ServiceGuideDeliveryDescriptor can be used to quickly check which of the Service Guide fragments that have been received in the previous service coverage area are valid in the current service coverage area, and therefore don't have to be re-parsed and re-processed.

Although not expressly depicted, the fragments that constitute the service guide may include element and attribute values for fulfilling their purposes. In addition, one or more of the fragments of the service guide may be omitted, as desired. Also, one or more fragments of the service guide may be combined, as desired. Also, different aspects of one or more fragments of the service guide may be combined together, reorganized, and otherwise modified, or constrained as desired.

Figure 3:
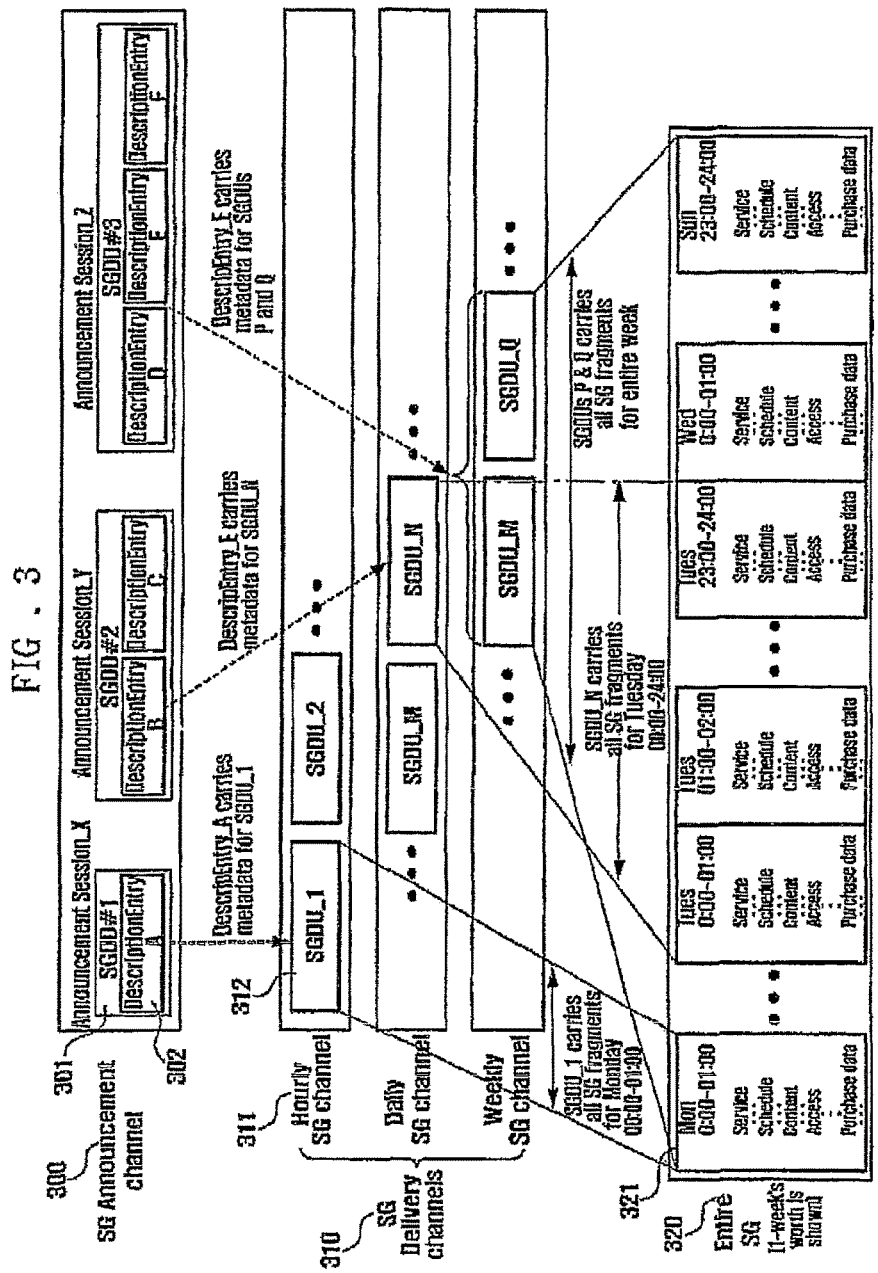
FIG. 3 is a block diagram illustrating a principle of the conventional service guide delivery method.

Referring to FIG. 3, an exemplary block diagram illustrates aspects of a service guide delivery technique. The Service Guide Delivery Descriptor 301 may include the session information, grouping information, and notification message access information related to fragments containing service information. When the mobile broadcast service-enabled terminal 105 turns on or begins to receive the service guide, it may access a SG Announcement Channel 300.

The SG Announcement Channel 300 may include at least one of SGDD 301 (e.g., SGDD #1, . . . , SGDD #2, SGDD #3), which may be formatted in any suitable format, such as that illustrated in Service Guide for Mobile Broadcast Services, Open Mobile Alliance, Version 1.0.1, Jan. 9, 2013 and/or Service Guide for Mobile Broadcast Services, open Mobile Alliance, Version 1.1, Oct. 29, 3013; both of which are incorporated by reference in their entirety. The descriptions of elements and attributes constituting the Service Guide Delivery Descriptor 201 may be reflected in any suitable format, such as for example, a table format and/or in an eXtensible Markup Language (XML) schema.

The actual data is preferably provided in XML format according to the SGDD 301. The information related to the service guide may be provided in various data formats, such as binary, where the elements and attributes are set to corresponding values, depending on the broadcast system.

The terminal 105 may acquire transport information about a Service Guide Delivery Unit (SGDU) 312 containing fragment information from a DescriptorEntry of the SGDD fragment received on the SG Announcement Channel 300.

The DescriptorEntry 302, which may provide the grouping information of a Service Guide includes the "GroupingCriteria", "ServiceGuideDeliveryUnit", "Transport", and AlternativeAccessURI". The transport-related channel information may be provided by the "Transport" or "AlternativeAccessURI", and the actual value of the corresponding channel is provided by "ServiceGuideDeliveryUnit". Also, upper layer group information about the SGDU 312, such as "Service" and "Genre", may be provided by "GroupingCriteria". The terminal 105 may receive and present one or more SGDU 312 to the user according to the corresponding group information.

Once the transport information is acquired, the terminal 105 may access the Delivery Channels acquired from a DescriptorEntry 302 in an SGDD 301 on an SG Delivery Channel 310 to receive the SGDU 312. The SG Delivery Channels can be identified using the "GroupingCriteria". In the case of time grouping, the SGDU can be transported with a time-based transport channel such as an Hourly SG Channel 311 and a Daily SG Channel. Accordingly, the terminal 105 can selectively access the channels and receive the SGDUs existing on the corresponding channels. Once the SGDU is received on the SG Delivery Channels 310, the terminal 105 checks the fragments contained in the SGDUs received on the SG Delivery Channels 310 and assembles the fragments to display an actual full service guide 320 on the screen which can be subdivided on an hourly basis 321.

In a mobile broadcast system, the service guide may be formatted and transmitted such that only configured terminals receive the broadcast signals of the corresponding broadcast system. For example, the service guide information transmitted by a DVB-H system can only be received by terminals configured to receive the DVB-H broadcast.

The service providers provide bundled and integrated services using various transmission systems as well as various broadcast systems in accordance with service convergence, which may be referred to as multiplay services. The broadcast service providers may also provide broadcast services on IP networks. Integrated service guide transmission and/or reception systems may be described using terms of entities defined in the 3GPP standards and OMA BCAST standards (e.g., a scheme). However, the service guide and/or reception systems may be used with any suitable communication and/or broadcast system.

Referring to FIG. 4, the scheme may include, for example, (1) Name; (2) Type; (3) Category; (4) Cardinality; (5) Description; and (6) Data type. The scheme may be arranged in any manner, such as a table format of an XML format.

The "name" column indicates the name of an element or an attribute. The "type" column indicates an index representing an element or an attribute. An element can be one of E1, E2, E3, E4, . . . , E[n]. E1 indicates an upper element of an entire message, E2 indicates an element below the E1, E3 indicates an element below E2, E4 indicates an element below the E3, and so forth. An attribute is indicated by A. For example, an "A" below E1 means an attribute of element E1. In some cases the notation may mean the following E=Element, A=Attribute, E1=sub-element, E2=sub-element's sub-element, E[n]=sub-element of element[n−1]. The "category" column is used to indicate whether the element or attribute is mandatory. If an element is mandatory, the category of the element is flagged with an "M". If an element is optional, the category of the element is flagged with an "O". If the element is optional for network to support it the element is flagged with a "NO". If the element is mandatory for terminal to support it is flagged with a TM. If the element is mandatory for network to support it the element is flagged with "NM". If the element is optional for terminal to support it the element is flagged with "TO". If an element or attribute has cardinality greater than zero, it is classified as M or NM to maintain consistency. The "cardinality" column indicates a relationship between elements and is set to a value of 0, 0 . . . 1, 1, 0 . . . n, and 1 . . . n. 0 indicates an option, 1 indicates a necessary relationship, and n indicates multiple values. For example, 0 . . . n means that a corresponding element can have no or n values. The "description" column describes the meaning of the corresponding element or attribute, and the "data type" column indicates the data type of the corresponding element or attribute.

A service may represent a bundle of content items, which forms a logical group to the end-user. An example would be a TV channel, composed of several TV shows. A 'Service' fragment contains the metadata describing the Mobile Broadcast service. It is possible that the same metadata (i.e., attributes and elements) exist in the 'Content' fragment(s) associated with that 'Service' fragment. In that situation, for the following elements: 'ParentalRating', 'TargetUserProfile', 'Genre' and 'BroadcastArea', the values defined in 'Content' fragment take precedence over those in 'Service' fragment.

The program guide elements of this fragment may be grouped between the Start of program guide and end of program guide cells in a fragment. This localization of the elements of the program guide reduces the computational complexity of the receiving device in arranging a programming guide. The program guide elements are generally used for user interpretation. This enables the content creator to provide user readable information about the service. The terminal should use declared program guide elements in this fragment for presentation to the end-user. The terminal may offer search, sort, etc. functionalities. The Program Guide may consist of the following service elements: (1) Name; (2) Description; (3) AudioLanguage; (4) TextLanguage; (5) ParentalRating; (6) TargetUserProfile; and (7) Genre.

The "Name" element may refer to Name of the Service, possibly in multiple languages. The language may be expressed using built-in XML attribute 'xml:lang'.

The "Description" element may be in multiple languages and may be expressed using built-in XML attribute 'xml:lang'.

The "AudioLanguage" element may declare for the end users that this service is available with an audio track corresponding to the language represented by the value of this element. The textual value of this element can be made available for the end users in different languages. In such a case the language used to represent the value of this element may be signaled using the built-in XML attribute 'xml:lang', and may include multi-language support. The AudioLanguage may contain an attribute languageSDPTag.

The "languageSDPTag" attribute is an identifier of the audio language described by the parent 'AudioLanguage' element as used in the media sections describing the audio track in a Session Description. Each 'AudioLanguage' element declaring the same audio stream may have the same value of the 'languageSDPTag'.

The "TextLanguage" element may declare for the end user that the textual components of this service are available in the language represented by the value of this element. The textual components can be, for instance, a caption or a sub-title track. The textual value of this element can be made available for the end users in different languages. In such a case the language used to represent the value of this element may be signaled using the built-in XML attribute 'xml:lang', and may include multi-language support. The same rules and constraints as specified for the element 'AudioLanguage' of assigning and interpreting the attributes 'languageSDPTag' and 'xml:lang' may be applied for this element.

The "languageSDPTag" attribute is an identifier of the text language described by the parent 'TextLanguage' element as used in the media sections describing the textual track in a Session Description.

The "ParentalRating" element may declare criteria parents and might be used to determine whether the associated item is suitable for access by children, defined according to the regulatory requirements of the service area. The terminal may support 'ParentalRating' being a free string, and the terminal may support the structured way to express the parental rating level by using the 'ratingSystem' and 'ratingValueName' attributes.

The "ratingSystem" attribute may specifiy the parental rating system in use, in which context the value of the 'ParentalRating' element is semantically defined. This allows terminals to identify the rating system in use in a non-ambiguous manner and act appropriately. This attribute may be instantiated when a rating system is used. Absence of this attribute means that no rating system is used (i.e. the value of the 'ParentalRating' element is to be interpreted as a free string).

The "ratingValueName" attribute may specify the human-readable name of the rating value given by this ParentalRating element.

The "TargetUserProfile" may specify elements of the users whom the service is targeting at. The detailed personal attribute names and the corresponding values are specified by attributes of 'attributeName' an 'attributeValue'. Amongst the possible profile attribute names are age, gender, occupation, etc. (subject to national and/or local rules & regulations, if present and as applicable regarding use of personal profiling information and personal data privacy). The extensible list of 'attributeName' and 'attributeValue' pairs for a particular service enables end user profile filtering and end user preference filtering of broadcast services. The terminal may be able to support 'TargetUserProfile' element. The use of 'TargetUserProfile' element may be an "opt-in" capability for users. Terminal settings may allow users to configure whether to input their personal profile or preference and whether to allow broadcast service to be automatically filtered based on the users' personal attributes without users' request. This element may contain the following attributes: attributeName and attributeValue.

The "attributeName" attribute may be a profile attribute name.

The "attributeValue" attribute may be a profile attribute value.

The "Genre" element may specify classification of service associated with characteristic form (e.g. comedy, drama). The OMA BCAST Service Guide may allow describing the format of the Genre element in the Service Guide in two ways. The first way is to use a free string. The second way is to use the "href" attributes of the Genre element to convey the information in the form of a controlled vocabulary (classification scheme as defined in [TVA-Metadata] or classification list as defined in [Moving Image Genre-Format Guide (MIGFG)]). The built-in XML attribute xml:lang may be used with this element to express the language. The network may instantiate several different sets of 'Genre' element, using it as a free string or with a 'href' attribute. The network may ensure the different sets have equivalent and nonconflicting meaning, and the terminal may select one of the sets to interpret for the end-user. The 'Genre' element may contain the following attributes: type and href.

The "type" attribute may signal the level of the 'Genre' element, such as with the values of "main", "second", and "other".

The "href" attribute may signal the controlled vocabulary used in the 'Genre' element.

After reviewing the set of programming guide elements and attributes it was determined that the receiving device may have insufficient information defined within the programming guide to appropriately render the information in a manner suitable for the viewer. The information included together with the parental ratings, and in particular a content advisory rating, is insufficient to appropriately render the information in a manner suitable for the viewer. The term parental ratings and content advisory ratings may be used interchangeably.

In an example of an existing content advisory service includes a binary syntax that includes three primary syntax elements. A first primary syntax may include (1) a descriptor_tag, (2) a descriptor_length, and (3) a rating_region_count. A second primary syntax may include a loop over rating_region count indicating (1) a rating_region, (2) a rated_dimensions, (3) a rating_description_length, and (4) a rating_Descriptiontext( ). A third primary syntax may include a loop over rated_dimensions indicating (1) a rating_dimension_j, and (2) a rating_value.

In an example of a modified existing content advisory service may further include a RatingDimVal dta type that includes a RatingValueString. The number of occurrences of the RatingDimVal element must and/or may be equal to the value inside the RatedDimensions element. The value of the element RatingDimension shall and/or may be less than or equal to the number of rating dimensions defined in the rating region table (or Rating Region Table). A rating region table is a data structure that defines the rating standard that is applicable for each region and/or country. The value of the element RatingValueString shall and/or may be equal to one of the values defined in the rating region table for the rating dimension indicated by the value of the associated RatingDimension element. The sub-elements are not signaled for bit-savings and inferring their value when not present the value of RatingDimension is inferred.

The content advisory service may be signaled in a hierarchical manner for service and content with over-ride rules.

The content advisory service is preferably provided using XML syntax and provided with a XML schema.

To appropriately render the information the content advisory rating information should be provided via syntax elements and sub-elements. Also content advisory rating should also be indicated for different rating regions in a manner suitable for such rating regions. Further, for each rating region, a rating value may be provided for one or more rating dimensions. In this manner, sufficient information may be defined for the content advisory ratings to appropriately render the information in a manner suitable for the viewer. Preferably, the content advisory rating information is provided in a XML format.

By way of example, one set of content advisory ratings especially suitable for the United States may be TV parental guidelines which may include information related to explicit sexual content, graphic violence, and strong profanity in television programs. One rating may be TV-Y which indicates the program is designed to be appropriate for all children. One rating may be TV-Y7 which indicates the program is designed for children age 7 and above. One rating may be TV-G which indicates most parents would find this program suitable for all ages. One rating may be TV-PG which indicates this program contains material that parents may find unsuitable for younger children. One rating may be TV-14 which indicates this program contains some materials that many parents would find unsuitable for children under 14 years of age. One rating may be TV-MA which indicates that this program is specifically designed to be viewed by adults and therefore may be unsuitable for children under 17. In addition, the rating may include sub-ratings, such as for example, D for suggestive dialogue, L for coarse language, S for sexual content, V for violence, FV for fantasy violence, and EI for educational and information. With these different choices and options, it is desirable to provide suitable information such that it may be rendered in a suitable manner.

By way of example, one set of content advisory ratings especially suitable for the United States may be Motion Picture Association of America (MPAA) film rating system which may include information which empowers families to make informed movie choices.

One rating may be G (General Audiences) which indicates nothing that would offend parents for viewing by children. One rating may be PG (Parental guidance suggested) which indicates parents urged to give "parental guidance". May contain some material parent might not like for their young children.

One rating may be PG-13 (Parents strongly cautioned) which indicates parents are urged to be cautious. Some material may be inappropriate for pre-teenagers.

One rating may be R (Restricted) which indicates contains some adult material. Parents are urged to learn more about the film before taking their young children with them.

One rating may be NC-17 (No one 17 and under admitted) which indicates clearly adult content and children are not admitted.

By way of example, one set of content advisory ratings especially suitable for the South Korea may include information related to all ages, inappropriate for children younger than 7, inappropriate for those younger than 12, in appropriate for children under 15, programs intended for adults only, and exempt. One rating may be All in Korean (모든 연령 시청가, Mo-deun yeon-ryeong si-cheong-ga)

which indicates programming that is appropriate for all ages. This program usually involves programs designed for children or families. This rating does not have an icon. One rating may be 7 in Korean (7세 이상 시청가, chil-se si-cheong-ga)

which indicates programming that may contain material inappropriate for children younger than 7, and parental discretion should be used. Some cartoon programming not deemed strictly as "educational", and films rated "G" or "PG" in North America may fall into the 7 category. One rating may be 12 in Korean (12세 이상 시청가, sib-ee-se ii-sang si-cheong-ga)

which indicates programs that may deemed inappropriate for those younger than 12, and parental discretion should be used. Usually used for animations that have stronger themes or violence then those designed for children, or for reality shows that have mild violence, themes, or language. One rating may be 15 in Korean (15세 이상 시청가, sib-o-se ii-sang si-cheong-ga)

which indicates programs that contain material that may be inappropriate for children under 15, and that parental discretion should be used. Examples include most dramas, and talk shows on OTA (over-the-air) TV (KBS, MBC, SBS), and many American TV shows and/or dramas on Cable TV channels like OCN and OnStyle. The programs that have this rating may include moderate or strong adult themes, language, sexual inference, and violence. As with the TV-MA rating in North America, this rating is commonly applied to live events where the occurrence of inappropriate dialogue is unpredictable. One rating may include 19 in Korean (19세 이상 시청가, sib-gu-se ii-sang si-cheong-ga)

which indicates programs that are intended for adults only. Programs that receive this rating will almost certainly have adult themes, sexual situations, frequent use of strong language and disturbing scenes of violence. One rating may be exempt which indicates knowledge based game shows; lifestyle shows; documentary shows; news; current topic discussion shows; education and/or culture shows; sports that excludes Mixed Martial Arts (MMA) and/or other violent sports; and other programs that Korea Communications Standards Commission recognizes. Some of these ratings may include icons while others do not include icons.

As it may be observed, for the United States the rating information is provided in English while for other countries, such as South Korea, the rating information may be provided in another language, such as Korean. In this manner, the content advisory ratings indication should accommodate the differences in the language. In addition, with the frequency of those fluent with different languages or rating systems, the content advisory system should accommodate the selection among a plurality of different ratings systems.

Figures 6, 7A:
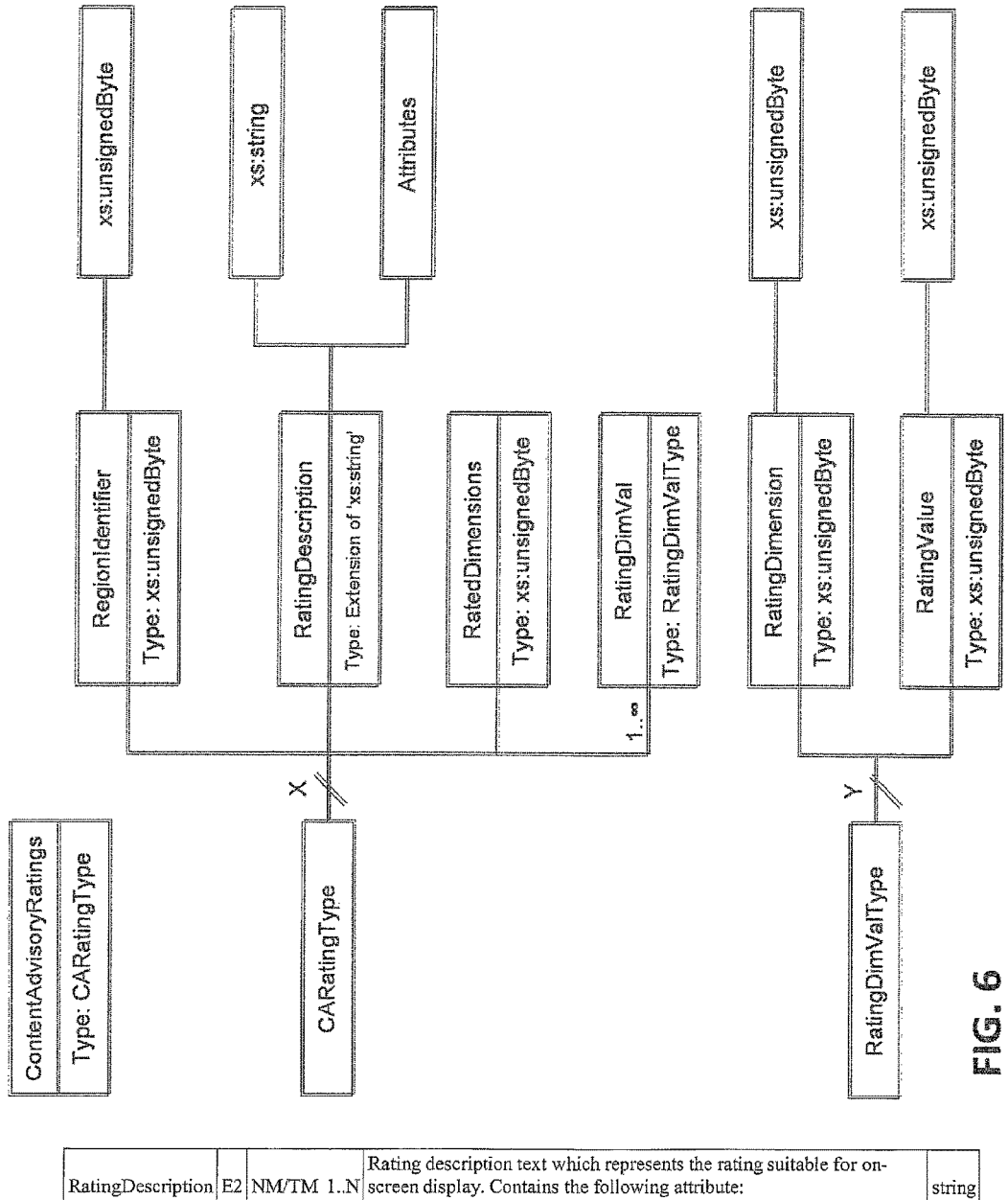
FIG. 6 illustrates a content advisory ratings information structure.
FIG. 7A illustrates a rating description.

Referring to FIG. 5 and to FIG. 6, the content advisory ratings in the service announcement may include a plurality of different elements, sub-elements, and attributes for indicating content advisory ratings information in service announcements along with their semantic meanings. Although the FIGS. 5 and 6 and associated description below refers to service announcement the same information could be transmitted in service signaling or some other service related transmission and reception.

The ContentAdvisoryRatings is an upper element E1 of an entire message which is mandatory for a terminal to support it (e.g., TM) and mandatory for a network to support it (e.g., NM) with no value or multiple values (0 . . . N). The content advisory rating for each rating region may contain one or more of the following elements, namely, RegionIdentifier, RatingDescription, RatedDimensions, and RatingDimVal. The ContentAdvisoryRatings may be of a type CARatingType which indicates the number of content advisory ratings.

The CARatingType may include the RegionIdentifier, RatingDescription, RatedDimensions, and RatingDimVal. The RegionIdentifier is a sub-element (e.g., E2) of ContentAdvisoryRatings of a message which is mandatory for a terminal to support it (e.g., TM) and mandatory for a network to support it (e.g., NM) with cardinality of 0 (i.e. element is absent) or 1 element (e.g, cardinality of 0 . . . 1). The RegionIdentifier specifies the rating region for which the rating description and rating dimension, and rating value data is specified. If not present the value of RegionIdentifier is inferred to be 0. The RegionIdentifier may be of a type xs:unsignedByte which identifies a country or a region or otherwise.

The RatingDescription is a sub-element (e.g., E2) of ContentAdvisoryRatings of a message which is mandatory for a terminal to support it (e.g., TM) and mandatory for a network to support it (e.g., NM) with a cardinality of 1 element indicating a necessary occurrence of this element. The RatingDescription specifies a rating description text which represents the rating suitable for on-screen display. The RatingDescription may include an attribute xml:lang. The RatingDescription may be of a type xs:string.

The xml:lang is an attribute (e.g., A) of sub-element E2 RatingDescription of a message which is mandatory for a terminal to support it (e.g., TM) and mandatory for a network to support it (e.g., NM) with a cardinality of 0 (i.e. element is not present) or 1 element value (e.g, cardinality of 0 . . . 1). The xml:lang indicates the language of the RatingDescription expressed with an XML attribute xml:lang. The xml:lang may be of a type xs:string.

The RatedDimensions is a sub-element (e.g., E2) of ContentAdvisoryRatings of a message which is mandatory for a terminal to support it (e.g., TM) and mandatory for a network to support it (e.g., NM) with no element or 1 element (e.g, cardinality of 0 . . . 1). The RatedDimensions specifies the number of region specific rating dimensions for which content advisory rating is specified. The RatedDimensions may be of a type xs:unsignedByte which indicates a number of dimensions.

The RatingDimVal is a sub-element (e.g., E2) of ContentAdvisoryRatings of a message which is mandatory for a terminal to support it (e.g., TM) and mandatory for a network to support it (e.g., NM) with no element or multiple elements (cardinality of 0 . . . N). The RatingDimVal specifies the content advisory rating dimension and rating value for each rated dimension. The RatingDimVal may contain RatingDimension and RatingValue. The RatingDimVal may be of a type RatingDimValType.

The RatingDimension is a sub-element (e.g., E3) of RatingDimVal of a message which is mandatory for a terminal to support it (e.g., TM) and mandatory for a network to support it (e.g., NM) with no element or 1 element (e.g., cardinality of 0 . . . 1). When not present the value of RatingDimension is inferred to be equal to 0. The RatingDimension specifies a rating dimension index for which the rating value is specified. The RatingDimension may be of a type xs:unsignedByte.

The RatingValue is a sub-element (e.g., E3) of RatingDimVal of a message which is mandatory for a terminal to support it (e.g., TM) and mandatory for a network to support it (e.g., NM) with a cardinality of 1 indicating the element may be present, i.e. is mandatory. The RatingValue specifies rating value for the rating dimension specified in the associated RatingDimension element. In an alternate example the RatingValue may include an attribute xml:lang which specifies the language for the RatingValue. The RatingValue may be of a type xs:unsignedByte.

In another example, the number of occurrences of the RatingDimVal element may be equal to the value inside the RatedDimensions element.

In another example, the value of the element RatingDimension may be less than or equal to the number of rating dimensions defined in the rating region table.

In another example, the value of the element RatingDimension may be less than or equal to the element dimensions_defined in the rating region table defined in the Program and System Information Protocol (PSIP) Content Advisory Descriptor of Advanced Television Systems Committee (ATSC) A/65: 2013, Program and System Information Protocol, incorporated by reference herein in its entirety.

In another example, the value of the element RatingValue may be less than or equal to the number of rating values defined in the rating region table for the rating dimension indicated by the value of the associated RatingDimension element.

In another example, the value of the element RatingValue may be less than or equal to the number of rating values defined in the element values_defined in the rating region table for the rating dimension indicated by the value of the associated RatingDimension element with values_defined being an element rating region table in PSIP Content Advisory Descriptor of ATSC A/65: 2013, Program and System Information Protocol, incorporated by reference herein in its entirety.

In another example, when not present the value of RatingDimension is inferred to be 0.

In another example, when not present the value of RegionIdentifier is inferred to be 0.

In another example, when not present the value of RegionIdentifier is inferred to be 0, which is inferred to be zero valued rating for the rating dimension(s).

In another example, the RatingDescription element which represents the rating description text follows the semantics of the rating_description_text( ) in PSIP Content Advisory Descriptor of ATSC A/65: 2013, Program and System Information Protocol, incorporated by reference herein in its entirety.

In another example, the RatingDescription string element may be indicated as multiple strings, as illustrated in FIG. 7A.

In an alternative example the cardinality of RegionIdentifier may be changed from 0 . . . 1 to 1 as illustrated in FIG. 7B. Thus in this case the RegionIdentifier is mandatory.

In an alternative example the cardinality of RatingDimension may be changed from 1 to 0 . . . 1 as illustrated in FIG. 7C. Thus in this case the RatingDimension is mandatory.

In another example, E1 of the PSIP Content Advisory Descriptor of ATSC A/65: 2013, Program and System Information Protocol, incorporated by reference herein in its entirety, may include its elements coded as binary data and embedded inside an XML element.

The content advisory rating information may be indicated in the service announcement at one or more locations, namely, (1) inside a Service fragment for a service, (2) inside a Content fragment for a content, and (3) inside a Content fragment for each component of a content.

In one example, an exemplary XML schema is illustrated in FIG. 8 which corresponds to structure in FIG. 6.

In one example, a portion of an exemplary XML schema is illustrated in FIG. 9A. This may correspond to portion of XML schema corresponding to FIG. 8. In another example this portion of XML schema may be changed to another portion of XML schema such as that illustrated in FIG. 9B. Thus in one example the portion of XML schema in FIG. 8 corresponding to the XML schema of FIG. 9A may be changed to XML schema of FIG. 9B.

In another example, some of the use='optional' may be changed to use='required'.

In another example, some of the elements cardinality may be changed from 0 . . . 1 to 1.

In another example, for some of the elements the minOccurs="1" may be changed to minOccurs="0".

In another example, for some of the elements the minOccurs="0" may be changed to minOccurs="1".

In another example, for some of the elements the maxOccurs="unbounded" may be changed to maxOccurs="1".

In another example, some of the elements above may be changed from E2 to E1 or from E1 to E2 or from Ej to Ei for any j and i.

In another example, the cardinality of some of the elements may be changed. For example cardinality may be changed from "1" to "1 . . . N" or cardinality may be changed from "1" to "0 . . . N" or cardinality may be changed from "1" to "0 . . . 1" or cardinality may be changed from "0 . . . 1" to "0 . . . N" or cardinality may be changed from "0 . . . N" to "0 . . . 1".

In another example, some of the elements could be signaled as attributes.

In another example, some of the required elements may be changed to optional elements or vice-a-versa.

In another example, some of the "NM/TM" values in the "category" may be changed to "NM/TO" or "NO/TM" or "NO/TO", with TM means mandatory for a terminal to support it and NM means mandatory for a network to support it, TO means optional for a terminal to support it and NO means optional for a network to support it.

In another example, other formats, for example JavaScript Object Notation (JSON), Comma Separated Values (CSV), Backus-Naur Form (BNF), Augmented Backus-Naur Form (ABNF), and/or Extended Backus-Naur Form (EBNF), may be used for representing the same information conveyed in the XML format.

In another example, additional namespace qualifier may be added for an xml element, attribute, and/or type. For example <xs:element name="CARatingType"> may be called <xs:complexType name="atsc3:CARatingType"> or <xs:complexType name="atsc:CARatingType"> where atsc3 and atsc respectively indicate namespace.

In another example, for example <xs:element name="RegionIdentifier" . . . may be called <xs:element name="atsc3:RegionIdentifier" . . . or <xs:element name="atsc:RegionIdentifier" . . . where atsc3 and atsc respectively indicate namespace.

In another example, elements ContentAdvisoryRatings, RegionIdentifier, RatingDescription, RatedDimensions, RatingDimVal, RatingDimension, RatingValue may be called car, ri, rde, rdis, rdv, rd, ry respectively. Other such abbreviations are also anticipated. The benefit here is to save number of bytes required to signal the XML data. Thus when listing several strings the representation as an example <rd>5</rd> will require less bytes than <RatingDimension>String1</RatingDimension>.

By way of example, referring again to FIG. 6, there may be N number of CARatingTypes for the content advisory rating. By way of example, the RegionIdentifier may be a number that refers to a rating system of a particular country (e.g., South Korea or United States) or a geographic region or otherwise. By way of example, the RatingDescription may be program's rating in abbreviated form or otherwise suitable for on-screen display. For example this may be "TV-Y7 FV" to indicate program directed to older children (with age 7 and above) with fantasy violence as per TV parental guidelines ratings. By way of example, the RatedDimensions may indicate the number of different ratings within the particular region previously identified that is included within the particular syntax structure. By way of example, RatingDimVal is a structure that provides for the number of different ratings of RatedDimensions, and are provided as pairs of the RatingDimension and RatingValue for the particular content. The RatingDimension indicates which of the ratings (e.g., as an index into a table) and the RatingValue indicates the value of that RatingValue. By way of example, a first RatingDimension may be MPAA (e.g., an index within a rating region table) with a RatingValue of PG, a second RatingDimension may be TV Parental Guidelines (e.g., an index within a rating region table) with a RatingValue of TV:PG. In this manner, the syntax supports multiple rating systems for a particular region.

For an alternative example, referring to FIG. 10A and to FIG. 22A, the content advisory ratings in the service announcement may include a binary coded element along with its semantic meaning. In this example the PSIP Content Advisory Descriptor including its elements could be coded as binary data according to the syntax specified for the descriptor in A/65: 2013 and then it can be embedded inside an XML element as specified in FIG. 10A and shown in FIG. 22A. Although FIG. 10A and FIG. 22A and their associated description refers to service announcement the same information could be transmitted in service signaling or some other service related transmission and reception.

For an alternative example, referring to FIG. 10B and to FIG. 22B, the content advisory ratings in the service announcement may include a binary coded element along with its semantic meaning. In this example the PSIP Content Advisory Descriptor including its elements could be coded as binary data according to the syntax specified for the descriptor in A/65: 2013 and maybe further encoded using base64 encoding and then it can be embedded inside an XML element as specified in FIG. 10B and shown in FIG. 22B.

Although FIG. 10B and FIG. 22B and their associated description refers to service announcement the same information could be transmitted in service signaling or some other service related transmission and reception.

Further examples are described below. In this case the Content Advisory Descriptor encoded and signaled (or indicated) inside atsc:ContentAdvisoryRatings element coded with the date type string or base64Binary may use the syntax shown in FIG. 11. In FIG. 11 compared to PSIP Content Advisory Descriptor of A65/2013, unnecessary elements are removed and some elements are modified.

The main changes in content advisory ratings description of FIG. 11 compared to PSIP content advisory descriptor of A65/2013 include the following: (1) Elements descriptor_tag is removed. This is because the defined XML structure is encapsulated inside <ContentAdvisoryRatings> element which is adequate for unambiguous parsing. (2) Elements descriptor_length is removed. This is because the defined XML structure allows parser to know the length. (3) The reserved element 2 bits in the prefix of the byte for rating_region_count element are changed to '00' from '11'. This allows the value indicated in rating_region_count to be read in this version of the specification to be read without using a mask for the last 6 bits. (4) The reserved element 4 bits in the prefix of the byte for rating_value element are changed to '0000' from '1111'. This allows the value indicated in rating_value to be read in this version of the specification to be read without using a mask for the last 4 bits.

Additional details and alternative examples for the location for content advisory rating information is described below. As previously described the content advisory rating information may be indicated in the service announcement at one or more locations, namely, (1) inside a Service fragment for a service, (2) inside a Content fragment for a content, and/or (3) inside a Content fragment for each component of a content.

When the content advisory rating information is indicated inside a ATSC and/or OMA BCAST 'Service' fragment using various elements and attributes corresponding to FIG. 5, it could be indicated as shown in FIG. 12.

When the content advisory rating information is indicated inside a ATSC and/or OMA BCAST 'Service' fragment, the variant from example E1 which indicates the element ContentAdvisoryRatings as a string with binary encoded data corresponding to PSIP Content Advisory Descriptor corresponding to FIG. 10A could be indicated as shown in FIG. 13.

When the content advisory rating information is indicated inside a ATSC and/or OMA BCAST 'Service' fragment, the variant from example E2 which indicates the element ContentAdvisoryRatings as a base64Binary with base64 encoded data corresponding to PSIP Content Advisory Descriptor corresponding to FIG. 10B could be indicated as shown in FIG. 14.

The content advisory ratings information could be included in content fragment instead of in service fragment or in addition to in the service fragment. When content advisory information is included in the service fragment and the content fragment then the information in the content fragment over-rides the information in the service fragment.

When the content advisory rating information is indicated inside a ATSC and/or OMA BCAST 'Content' fragment using various elements and attributes corresponding to FIG. 5, it could be indicated as shown in FIG. 15.

When the content advisory rating information is indicated inside a ATSC and/or OMA BCAST 'Content' fragment, the variant from example E1 which indicates the element ContentAdvisoryRatings as a string with binary encoded data corresponding to PSIP Content Advisory Descriptor corresponding to FIG. 10A could be indicated as shown in FIG. 16.

When the content advisory rating information is indicated inside a ATSC and/or OMA BCAST 'Content' fragment, the variant from example E2 which indicates the element ContentAdvisoryRatings as a base64Binary with base64 encoded data corresponding to PSIP Content Advisory Descriptor corresponding to FIG. 10B could be indicated as shown in FIG. 17.

The content advisory ratings information could be included in content fragment additionally for each component in addition to as defined above. Alternatively the content advisory ratings information could be included in the content fragment only for one or more components. Also this information may be included for each component of a content in content fragment instead of in service fragment or in addition to in the service fragment. When content advisory information is included in the service fragment and the content fragment then the information in the content fragment over-rides the information in the service fragment.

Inside the content fragment if content advisory information is included outside of each content components and inside one or more content components, then the information inside a content component over-rides the information outside the content component and also over-rides the information in the service fragment.

When the content advisory rating information is indicated inside a ATSC and/or OMA BCAST 'Content' fragment for each of the components of the content it could be indicated as shown in FIG. 18.

In an example element ContentAdvisoryRatings included as the sub-element inside each of the elements AudioComponent, VideoComponent, CCComponent, AppComponent could be indicated as shown in FIG. 19.

In another element ContentAdvisoryRatings included as the sub-element inside each of the elements AudioComponent, VideoComponent, CCComponent, AppComponent could be indicated as shown in FIG. 20. This could be the case which indicates the element ContentAdvisoryRatings as a string with binary encoded data corresponding to PSIP Content Advisory Descriptor.

In another element ContentAdvisoryRatings included as the sub-element inside each of the elements AudioComponent, VideoComponent, CCComponent, AppComponent could be indicated as shown in FIG. 21. This could be the case which indicates the element ContentAdvisoryRatings as a string with base64 encoded data corresponding to PSIP Content Advisory Descriptor.

Although the above variant shows the ContentAdvisoryRatings element and its sub-elements to be included for each of the elements AudioComponent, VideoComponent, CCComponent, AppComponent, in another example ContentAdvisoryRatings element and its sub-elements may be included for only one or more of the elements AudioComponent, VideoComponent, CCComponent, AppComponent. Also in another example the ContentAdvisoryRatings element and its sub-elements may be included as sub-elements of any other element inside Content fragment. In particular they may be included as sub-elements of any presentable component element.

In one example, an exemplary XML schema is illustrated in FIG. 23A which corresponds to structure in FIG. 10A.

In one example, an exemplary XML schema is illustrated in FIG. 23B which corresponds to structure in FIG. 10B.

Additional examples are described next.

A new RatingValueString element is proposed for content advisory rating information. This element allows keeping a content advisory rating information for a service, content, and/or component unchanged even when rating region table is changed (for example by insertion of a new rating) when graduated scale is used.

Additional constraints related to RatingValue and RatingValueString elements of content advisory information are described.

For an alternative example, referring to FIG. 24 and to FIG. 29, the content advisory ratings in the service announcement may include elements, sub-elements and attributes as shown. In this example a new RatingValueString element is proposed for content advisory rating information. The RatingValueString element allows keeping a content advisory rating information for a service, content, and/or component unchanged even when rating region table is changed (for example by insertion of a new rating in between two ratings) when graduated scale is used. Although FIG. 24 and FIG. 29 and their associated description refers to service announcement the same information could be transmitted in service signaling or some other service related transmission and reception.

Additionally the following constraints apply in reference to FIG. 24 and FIG. 29.

The number of occurrences of the RatingDimVal element may be equal to the value inside the RatedDimensions element.

The value of the element RatingDimension may be less than or equal to the number of rating dimensions defined in the rating region table.

In one example the value of the element RatingDimension may be less than or equal to the element dimensions_defined in the rating region table.

The value of the element RatingValue may be less than or equal to the number of rating values defined in the rating region table for the rating dimension indicated by the value of the associated RatingDimension element.

In one example the value of the element RatingValue may be less than or equal to the number of rating values defined in the element values_defined in the rating region table for the rating dimension indicated by the value of the associated RatingDimension element.

The value of the element RatingValueString may be equal to one of the values defined (rating_value_text( )) in the rating region table for the rating dimension indicated by the value of the associated RatingDimension element.

There may be only one of the RatingValue or RatingValueString element present inside a RatingDimValue element.

When graduated_scale value in the rating region table for the rating dimension indicated by the value of the RatingDimension element inside a RatingDimVal element is equal to 1 the RatingValueString element may be present inside this RatingDimVal element.

In an additional example:

When graduated_scale value in the rating region table for the rating dimension indicated by the value of the RatingDimension element inside a RatingDimVal element is equal to 0 the RatingValue element may be present inside this RatingDimVal element.

When graduated_scale value in the rating region table for the rating dimension indicated by the value of the RatingDimension element inside a RatingDimVal element is equal to 1 the RatingValue element may not be present inside this RatingDimVal element.

When graduated_scale value in the rating region table for the rating dimension indicated by the value of the RatingDimension element inside a RatingDimVal element is equal to 0 the RatingValueString element may not be present inside this RatingDimVal element.

When not present the value of RatingDimension is inferred to be equal to 0.

When not present the value of RegionIdentifier is inferred to be 0.

When not present the value of RegionIdentifier is inferred to be 0, which is inferred to be zero valued rating for the rating dimension(s).

For an alternative example, referring to FIG. 25, FIG. 26 and to FIG. 30, the content advisory ratings in the service announcement may be defined based on the Internet Protocol Television (IPTV) electronic program guide metadata specification ATIS-08000020 section "5.7.3 RRT Parental Guidance Type" with the extensions and constraints as described below. In an example, the specification provides information defining ratings region table (RRT).

In this case the element RatingValueString may be added as sub-element of Dimension element as shown in FIG. 25.

Also in this case the attribute xml:lang may be added for the RatingDescriptionText element as shown in FIG. 26.

In another example elements, sub-elements and attributes for indicating content advisory ratings information in service announcement along with their semantics meaning in this case is described in FIG. 27.

In another example elements, sub-elements and attributes for indicating content advisory ratings information in service announcement along with their semantics meaning in this case is described in FIG. 28.

Additionally one or more of the following constraints apply in reference to FIG. 25-28.

The value of the element RatingDimension may be less than or equal to the number of rating dimensions_defined (dimensions_defined) in the rating region table.

The value of the element RatingValue may be less than or equal to the number of rating values defined (values_defined) in the rating region table for the rating dimension indicated by the value of the associated RatingDimension element.

The value of the element RatingValueString may be equal to one of the values defined (rating_value_text( )) in the rating region table for the rating dimension indicated by the value of the associated RatingDimension element.

There may be only one of the RatingValue or RatingValueString element present inside a RatingDimValue element.

When graduated_scale value in the rating region table for the rating dimension indicated by the value of the RatingDimension element inside a RatingDimVal element is equal to 1 the RatingValueString element may be present inside this RatingDimVal element.

When graduated_scale value in the rating region table for the rating dimension indicated by the value of the RatingDimension element inside a RatingDimVal element is equal to 0 the RatingValue element may be present inside this RatingDimVal element.

When graduated_scale value in the rating region table for the rating dimension indicated by the value of the RatingDimension element inside a RatingDimVal element is equal to 1 the RatingValue element may not be present inside this RatingDimVal element.

When graduated_scale value in the rating region table for the rating dimension indicated by the value of the RatingDimension element inside a RatingDimVal element is equal to 0 the RatingValueString element may not be present inside this RatingDimVal element.

Cardinality of RatingDimension is 0 . . . 1. When not present the value of RatingDimension is inferred to be equal to 0.

When not present the value of ratingRegion is inferred to be 0.

When not present the value of ratingRegion is inferred to be 0, which is inferred to be zero valued rating for the rating dimension(s).

Although FIG. 25, FIG. 26, FIG. 27, FIG. 28 and FIG. 30 and their associated description refers to service announcement the same information could be transmitted in service signaling or some other service related transmission and reception.

In one example, an exemplary XML schema is illustrated in FIG. 31 which corresponds to structure in FIG. 29.

Figure 30:
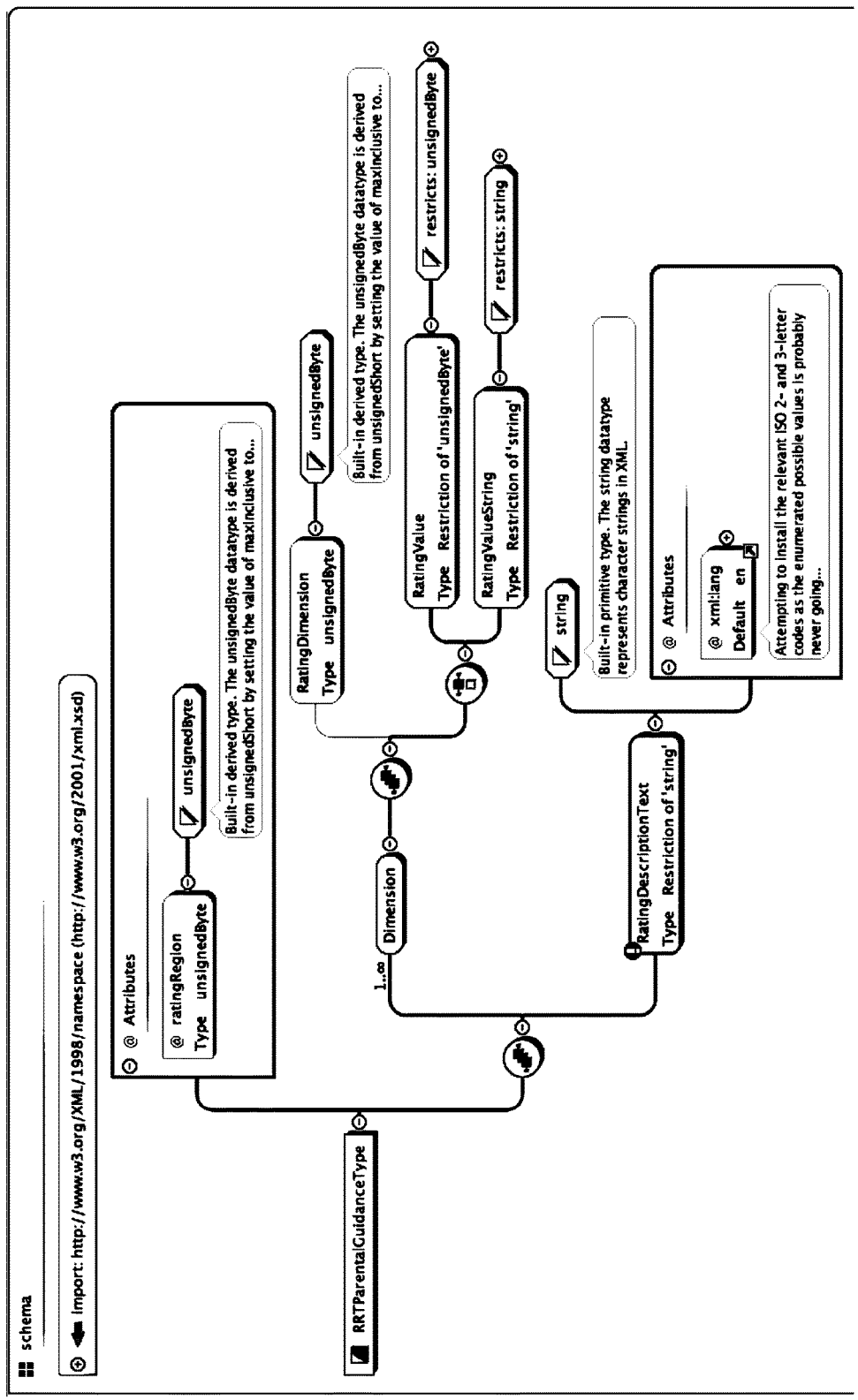
FIG. 30 illustrates a content advisory ratings information structure.

In one example, an exemplary XML schema is illustrated in FIG. 32 which corresponds to structure in FIG. 30.

In an example the location for indicating content advisory ratings information may be as defined below.

The content advisory rating information can be indicated in service announcement at one or more of the following locations:

(1) Inside a Service Fragment for a Service

Content advisory rating information (ContentAdvisoryRatings element) can be indicated inside a ATSC and/or OMA BCAST 'Service' fragment inside PrivateExt element as shown in "Content Advisory Ratings in Service Announcement inside a Service fragment".

| Content Advisory Ratings in Service Announcement inside a Service fragment | | | | | |
|---|---|---|---|---|---|
| Name | Type | Category | Cardinality | Description | Data Type |
| Service | E | | | 'service' fragment . . . | |
| . . . | | | | | |
| PrivateExt | E1 | NO/TM | 0 . . . 1 | An element serving as a container for proprietary or application-specific extensions. | |
| ContentAdvisoryRatings | E2 | NM/TM | 0 . . . N | Elements, sub-elements and attributes for ContentAdvisoryRatings. | |

(2) Inside a Content Fragment for a Content

The content advisory ratings information (ContentAdvisoryRatings element) can be included in 'content' fragment instead of in 'service' fragment or in addition to in the 'service' fragment as shown in "Content Advisory Ratings in Service Announcement inside a Content fragment". When content advisory information is included in the 'service' fragment and the 'content' fragment then the information in the 'content' fragment over-rides the information in the 'service' fragment.

| Content Advisory Ratings in Service Announcement inside a Content fragment | | | | | |
|---|---|---|---|---|---|
| Name | Type | Category | Card-inality | Description | Data Type |
| Content | E | | | 'Content' fragment . . . | |
| . . . | | | | | |
| PrivateExt | E1 | NO/TM | 0 . . . 1 | An element serving as a container for proprietary or application-specific extensions. | |
| ContentAdvisoryRatings | E2 | NM/TM | 0 . . . N | Elements, sub-elements and attributes for ContentAdvisoryRatings. | |

(3) Inside a Content Fragment for Each Component of a Content

The content advisory ratings information (ContentAdvisoryRatings element) could be included in 'content' fragment additionally for each component in addition to as described previously. When content advisory information is included in the 'service' fragment and the 'content' fragment then the information in the 'content' fragment over-rides the information in the 'service' fragment. Inside the 'content' fragment if content advisory information is included outside of each content components and inside one or more content components, then the information inside a content component over-rides the information outside the content component and also over-rides the information in the 'service' fragment.

Further description and examples are now provided about Rating Region Table (RRT).

In an example, a broadcast emission may include one or more RRTs, each corresponding to a particular identified value of Rating Region. RRTs shall be represented with XML instance documents. Each instance shall contain at least one, but not more than two, RRTs. Example rules for construction of RRT instance documents are described below.

In an example, RRTs shall be contained within the RatingRegionTables element, with the characteristics shown in either FIG. 33, or FIG. 36 or FIG. 39. The RRT shall be represented as an XML document containing a RatingRegionTables root element that conforms to the definitions in the XML schema that has xs:namespace "http://www.w3.org/2001/XMLSchema".

FIG. 33 describes various elements and attributes of Rating Region Table along with semantic meanings. FIG. 33, FIG. 36 and FIG. 39 refer to a TextType element which, in one example, is defined further in FIG. 34.

FIG. 35 shows an example XML schema for Rating Region Table. This XML schema may correspond with the elements and attributes shown in FIG. 33. With respect to XML schema in FIG. 35 following applies:

A Custom XML data type, dimension level type (DimLevelType), is defined. This type disallows zero number of dimension levels to be signaled, which may have a benefit of reducing signaling overhead There must be at least one dimension level signalled in a RRT, thus this restriction is defined.

A custom XML data type, region identifier type (RIType), is defined. This type disallows zero value for region identifier, which may have a benefit of reduced signaling overhead. The region identifier value of 0 is disallowed in various regions (e.g. USA), thus this restriction is defined.

A default value is defined for language attribute. This has the benefit of not requiring signaling language value in case it has the default value, which can save bits when signaling rating region table.

In the example Rating Region Table shown in FIG. 35 a constraint is proposed as follows:

In each Rating element the number of occurrences of the RatingValueAbbrev element must be equal to the number of occurrences of RatingValueString element.

The constraint ensures that each abbreviated rating string has a corresponding rating value string which is human readable string. If this is not enforced then in with XML structure it will not be clear which abbreviates rating string corresponds to which rating value string.

Additionally following constraint may be specified for elements in FIG. 35:

Additionally in each Rating element the i'th RatingValueAbbrev element provides abbreviation corresponding to the i'th RatingValueString element.

Without this constraint the correspondence between an abbreviated rating string and a rating value string may be undefined (or unknown).

In an example, the Rating Region table elements and attributes shown in FIG. 33 may be modified further as shown in FIG. 36. Some differences between FIG. 33 and FIG. 36 Rating Region Table include:

In FIG. 36 The RatingValue is signaled as an element where as it is signalled as an attribute in FIG. 33. Signaling the RatingValue as an element has a benefit of allowing future extensibility. Also cardinality of RatingValueAbbrev and RatingValueString is changed from 1 . . . N to 1. Thus only one RatingValueAbbrev and RatingValueString is signalled in a Rating element. Since multiple Rating elements are allowed to be signalled this results in lower complexity for the parsing and/or decoding of the XML data.

Figure 38:
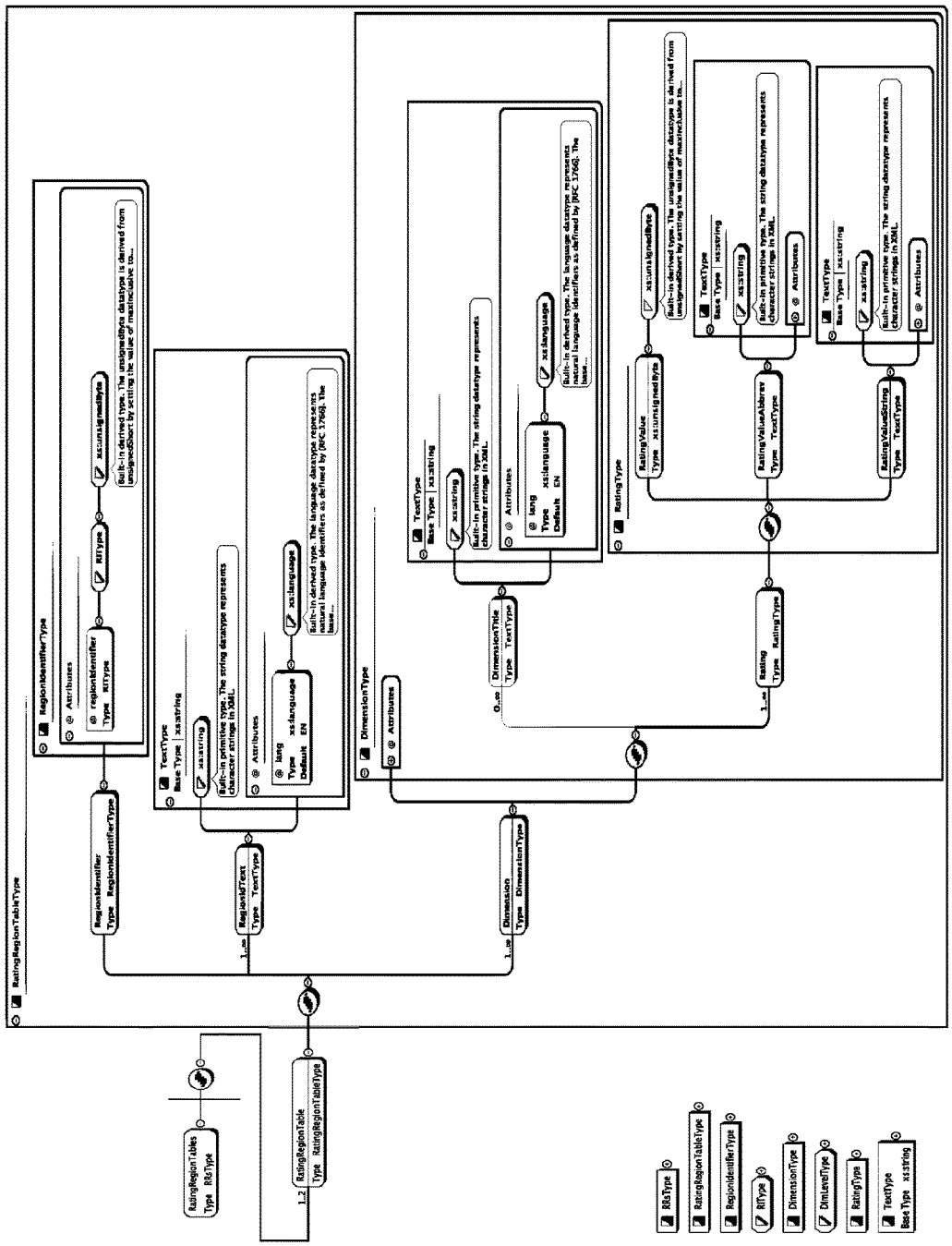
FIG. 38 illustrates structure of a Rating Region Table

FIG. 37 shows an example XML schema for Rating Region Table. This XML schema may correspond with the elements and attributes shown in FIG. 36. FIG. 38 further diagramattically illustrates the structure of XML schema shown in FIG. 37.

In another example, the Rating Region table elements and attributes shown in FIG. 36 and FIG. 33 could be modified further as shown in FIG. 39. Differences between FIG. 36 and FIG. 39 include:

The ratingValue, ratingValueAbbrev and ratingValueString are signalled as attributes of Rating element in FIG. 39 instead of as elements in FIG. 36. Signalling these as attributes allows a string that is shorter in size as elements need an end tag which is not needed for attributes. This may result in bit savings. Additionally in FIG. 39 the data type of xs:string is used for ratingValueAbbre and ratingValueString.

FIG. 40 shows an example XML schema for Rating Region Table. This XML schema may correspond with the elements and attributes shown in FIG. 39.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A device for decoding a service guide associated with a video bitstream comprising:
   a processor; and
   a memory associated with the processor, wherein the processor executes a program stored on the memory to perform:
   (a) receiving a fragment within said service guide;
   (b) receiving content advisory ratings information within said fragment that indicates advisory ratings for content of said video bitstream;
   said content advisory ratings information including:
   (i) a region identifier element that specifies a rating region for (1) a rating description, (2) a rating dimension, and (3) a rating value;
   (ii) a rating description element that represents a rating suitable for on-screen display;
   (iii) a rated dimensions element that represents the number of region specific rating dimensions for which content advisory rating is specified;
   (iv) a rating dimensions value element that represents rating dimension and a rating value string for each said rating dimension, said rating dimension and said rating value string being sub-elements of said rating dimensions value element, said rating dimension representing an index for which said rating value is specified and said rating value string representing a value text string for said rating dimension; and
   (v) language information indicative of a language of the rating description; and
   (c) decoding said service guide.

2. The device of claim 1 wherein said fragment is a content fragment.

3. The device of claim 1 wherein a number of occurrences of said rating dimensions value element is equal to the value inside said rated dimensions element.

4. The device of claim 1 wherein a value of said rating dimension is less than or equal to the number of said rating dimensions defined in a rating region table.

5. The device of claim 1 wherein a value of said rating value is equal to one of a value defined in a rating region table for said rating dimension indicated by a value of an associated said rating dimension.

6. The device of claim 1 wherein when not present a value of said rating dimension is inferred to be equal to zero.

7. The device of claim 1 wherein said content advisory ratings information is contained inside a service fragment.

8. The device of claim 7 wherein said content advisory ratings information is also contained within a content fragment.

9. The device of claim 1 wherein said content advisory ratings information includes said region identifier element that specifies said rating region for said (1) rating description, (2) rating dimension, and (3) rating value.

10. The device of claim 1 wherein said content advisory ratings information includes said rating description element that represents said rating suitable for on-screen display.

11. The device of claim 1 wherein said content advisory ratings information includes said rated dimensions element that represents said number of region specific rating dimensions for which content advisory rating is specified.

12. The device of claim 1 wherein said content advisory ratings information includes said rating dimensions value element that represents rating dimension and said rating value string for each said rating dimension.

13. The device of claim 1 wherein said ratings dimensions value element includes said rating dimension that represents said index for which said rating value is specified.

14. The device of claim 1 wherein said ratings dimensions value element includes said rating value string which represents said value text string for said rating dimension.

* * * * *